US008750388B2

(12) United States Patent
Okajima

(10) Patent No.: US 8,750,388 B2
(45) Date of Patent: Jun. 10, 2014

(54) MULTIVIEW VIDEO DECODING APPARATUS, MULTIVIEW VIDEO DECODING METHOD, MULTIVIEW VIDEO DECODING PROGRAM, AND MULTIVIEW VIDEO DECODING INTEGRATED CIRCUIT

(75) Inventor: Kazunori Okajima, Osaka (JP)

(73) Assignee: Panasonic Corporation, Osaka (JP)

( * ) Notice: Subject to any disclaimer, the term of this patent is extended or adjusted under 35 U.S.C. 154(b) by 335 days.

(21) Appl. No.: 13/196,444

(22) Filed: Aug. 2, 2011

(65) Prior Publication Data

US 2011/0286531 A1 Nov. 24, 2011

Related U.S. Application Data

(63) Continuation of application No. PCT/JP2010/003424, filed on May 21, 2010.

(30) Foreign Application Priority Data

Dec. 15, 2009 (JP) ................................. 2009-284534

(51) Int. Cl.
*H04N 11/02* (2006.01)
*H04N 11/04* (2006.01)

(52) U.S. Cl.
USPC ................................. 375/240.27; 375/240.12

(58) Field of Classification Search
CPC ...................................................... H04N 7/50
See application file for complete search history.

(56) References Cited

U.S. PATENT DOCUMENTS

| 5,767,898 A * | 6/1998 | Urano et al. ..................... 348/43 |
| 2008/0089428 A1* | 4/2008 | Nakamura et al. ....... 375/240.26 |
| 2009/0028248 A1* | 1/2009 | Kitahara et al. .......... 375/240.26 |

FOREIGN PATENT DOCUMENTS

| JP | 07-322302 | 12/1995 |
| JP | 08-047002 | 2/1996 |
| JP | 2003-319419 | 11/2003 |

OTHER PUBLICATIONS

"ITU-T: Telecommunication Standardization Sector of ITU, Recommendation ITU-T H.264", International Telecommunication Union, Mar. 2009, PP.

* cited by examiner

*Primary Examiner* — Joseph Ustaris
*Assistant Examiner* — Zhubing Ren
(74) *Attorney, Agent, or Firm* — McDermott Will & Emery LLP

(57) ABSTRACT

A mutliview video decoding apparatus including: a decoding unit which decodes one of coded videos without reference to a coded video to generate one of decoded videos, and decodes an other one of coded videos with reference to the one of the coded videos to generate an other one of decoded videos; an error detecting unit which detests an error-source image in the decoded videos; and a decoded image replacing unit which replaces the error-source image with an image generated using a previous image that is decoded before the error-source image, without using the second decoded video that is other than the first decoded video that includes the error-source image, and replaces an associated error image that is associated with the error-source image with an image generated using an associated previous image that is associated with the error-source image, without using the first decoded video.

12 Claims, 17 Drawing Sheets

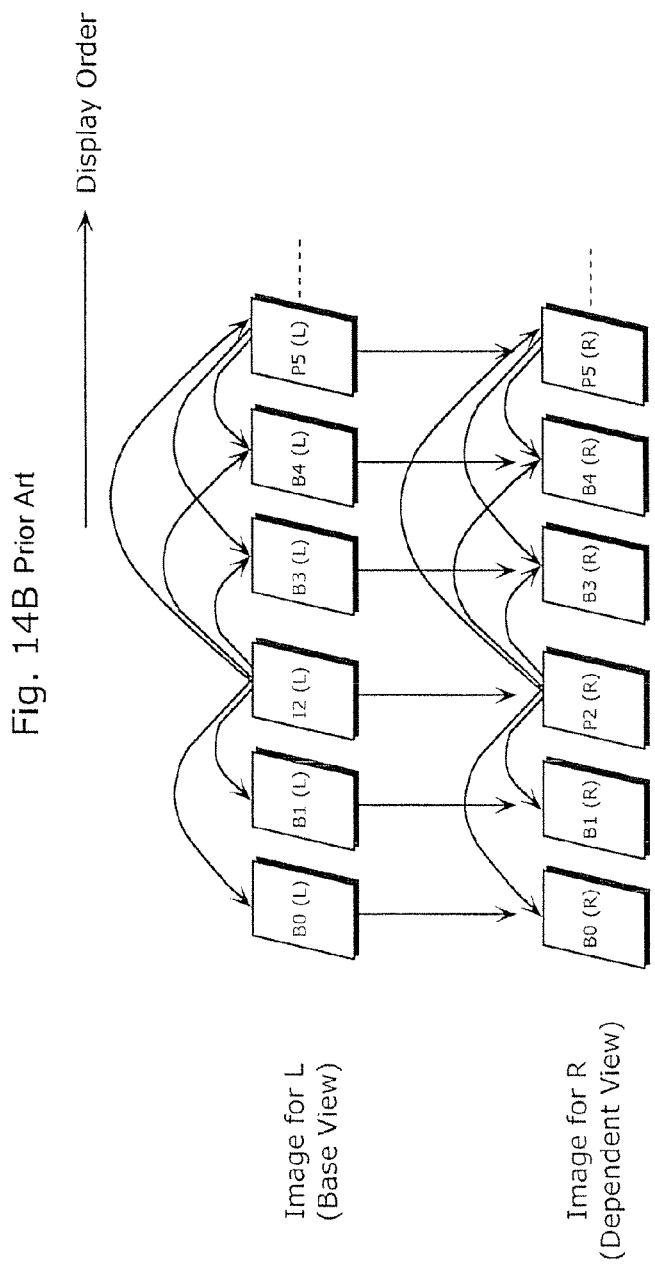

MULTIVIEW VIDEO DECODING APPARATUS, MULTIVIEW VIDEO DECODING METHOD, MULTIVIEW VIDEO DECODING PROGRAM, AND MULTIVIEW VIDEO DECODING INTEGRATED CIRCUIT

CROSS REFERENCE TO RELATED APPLICATION

This is a continuation application of PCT application No. PCT/JP2010/003424 filed on May 21, 2010, designating the United States of America.

BACKGROUND OF THE INVENTION (1) Field of the Invention

The present invention relates to a multiview video decoding apparatus, a multiview video decoding method, a multiview video decoding program, and a multiview video decoding integrated circuit for decoding a plurality of multiview coded video streams having a reference relationship.

(2) Description of the Related Art

There have been proposed three-dimensional image coding methods for enabling three-dimensional visual recognition by humans.

Examples of such methods include a method of preparing two kinds of videos including at least one video for the left eye and one video for the right eye captured in mutually different directions, coding the videos such that the two kinds of videos have a mutual reference relationship, and multiplexing the coded video streams to generate a multiview video.

This method has been recently standardized as the Multiview Video Coding (hereinafter referred to as MVC) in Non-Patent Reference 1 (International Telecommunication Union Telecommunication Standardization Sector (ITU-T) Recommendations "H.264", issued in March, 2009).

Each of FIGS. 14A and 14B is a diagram illustrating MVC according to the conventional art.

MVC defines coded video streams in which two kinds of videos from a plurality of viewpoints have a mutual reference relationship.

The MVC defines two kinds of multiview coded video streams: one of which is at least one coded video stream (hereinafter referred to as a coded video stream at the base view side) that does not refer to another coded stream and thus can be independently decoded by the coded video stream itself, and a plurality of streams (hereinafter referred to as coded video streams at the dependent view side) each of which has a mutual reference relationship with the base view.

The following exemplary descriptions are given assuming that the coded video stream at the base view side coded based on the left-eye viewpoint is a coded video stream for L, and that the coded video streams at the dependent view sides coded based on the right-eye viewpoints are coded video streams for R.

FIG. 14A is an illustration related to MVC, and shows an exemplary picture structure of the image for L (a decoded image resulting from the coded video stream at the base view side) and an exemplary picture structure of an image for R (a decoded image resulting from the coded video stream at the dependent view side).

In the diagram, images for L and images for R are shown in decode orders. In the diagram, I denotes a picture (hereinafter referred to as an I-picture) composed of intra coded images. In addition, P denotes a picture (hereinafter referred to as a P-picture) including inter coded images. In addition, B denotes a picture (hereinafter referred to as a B-picture) including bi-directional coded images.

As for the I-picture among the pictures, it is possible to reconstruct the original image data of the I-picture based only on the decoded data of the I-picture itself. However, the remaining P-picture and B-picture require a reference image and reference images, respectively, in addition to the result of decoding the pictures themselves so that the original image data of the pictures themselves can be reconstructed. Here, smaller numbers show images output earlier. In addition, (L) and (R) denote images for L and R, respectively.

FIG. 14B is an illustration related to MVC, and is a diagram showing the pictures in FIG. 14A in display order.

Each of the arrows in the diagram denotes a reference relationship, and more specifically, shows that, in inter coding, the image as a source of the arrow is referred to in order to reconstruct the image indicated by the arrow. For example, the diagram shows that, in order to decode B-picture B0 (L), I-picture I2 (L) as a reference image is required in addition to the result of decoding the B-picture B0 (L) itself. This is true of the other images for L that are Pictures B1 (L), B4 (L), and P5 (L).

The diagram shows that, among the images for R, each of images (pictures) B0 (R), B1 (R), B3 (R), B4 (R), and P5 (R) refers to a corresponding one of the images for R in the same manner as in the case of the images for L, and that these images (pictures) and image (picture) P2 (R) can also refer to the image for L that is displayed at a substantially the same display time as the display time of each of the pictures for R. In other words, the diagram shows that the images for R have reference relationships with images for L. In this case, the coded video stream for R shows a coded video stream at the dependent view side.

FIG. 15 is a diagram illustrating coded video streams in the conventional art coded according to the MVC Standard. In other words, the diagram shows an example of MVC-based reference relationships between the images for L and the images for R.

In the diagram, the upper sequence represents output images for the left eye, and the lower sequence represents output images for the right eye. In other words, L-1 to L-6 denote output images generated by decoding a coded video stream for the left eye, and R-1 to R-6 denote output images generated by decoding a coded video stream for the right eye. Here, smaller numbers show images output earlier.

In addition, the image name L-5 underlined denotes an output image generated by decoding an intra coded image, and the other image names denote output images generated by decoding inter coded images.

Each of the arrows shows that, in inter coding, the image that is the source of the arrow is referred to in order to decode the image indicated by the arrow. For example, the diagram shows that Images R-2 and L-3 are referred to in order to decode an image R-3.

In the cases where multiview coded video streams generated in this way are input from an optical disc or a hard disc, are transmitted using wireless communication, and are subjected to streaming distribution, there is a possibility that errors such as a bit reverse, a bit loss, and a bit inclusion occur before the multiview video streams reach the decoder sides. This causes a problem of degrading the image quality of the resulting decoded images.

Patent Reference 1 (Japanese Laid-open Patent Application Publication No. 2003-319419) discloses a multiview video decoding apparatus which solves this problem.

The decoding apparatus disclosed in Patent Reference 1 is an apparatus which generates reproduced images by reading out and decoding coded video streams from a recording medium having thereon coded video streams generated by imaging a subject in imaging directions.

This multiview video decoding apparatus includes: a recording medium reading circuit which reads out coded video streams from a recording medium having recorded thereon image data generated in the respective imaging directions when the subject is imaged in the respective imaging directions; and a decoding circuit which saves the coded video streams read out from the recording medium reading circuit and then decodes the coded video streams. The multiview video decoding apparatus further includes: a decoding error detecting circuit which detects whether or not any one of the coded video streams includes an error; a decoded image buffer in which the decoded images generated by the decoding circuit are stored for the respective imaging directions; and an error image concealing circuit which performs, in the case where one of the coded video streams includes an error, error concealment by replacing, in units of an image, decoded error images with a decoded image of another channel, and outputs the replacement as the output images.

The multiview video decoding apparatus disclosed in Patent Reference 1 has a structure as shown in FIG. 16. In other words, FIG. 16 is a block diagram of a structure of a multiview video decoding apparatus 1000 according to the conventional art. It is to be noted that the following descriptions are given assuming that the multi-channel coded streams are two-channel coded video streams that are an L-channel coded stream for the left eye and an R-channel coded stream for the right eye.

As shown in the diagram, the input multi-channel coded video streams are decoded by a decoding unit 1010 first to be decoded images. In the case where no error is found up to this process, the L-channel decoded image is sent to a decoded image buffer L1041 for the L channel as an output image L to be a final L-channel output image. Likewise, the R-channel decoded image is sent to a decoded image buffer R1042 for the R channel as an output image R to be a final R-channel output image.

These output images are sent to a display device for multiview video (for three-dimensional video) devised such that L-channel output images can be displayed for the left eye of a user and R-channel output images can be displayed for the right eye of the user. This allows the user to recognize the images as a three-dimensional video.

Here, if the error detecting unit 1020 detects an error in one of the channels, for example, in the R channel, and judges that accurate decoding is impossible, only the output image for the right eye may be lost, or an image including the error may be displayed.

In order to prevent this, the error detecting unit 1020 outputs, to an output image determining unit 1030, an instruction for causing the L-channel decoded image having substantially the same display time to be transferred also to the error image concealing unit R1060 for the R channel. The output image determining unit 1030 receives this instruction, and causes the L-channel decoded image to be output as an output image R from the decoded image buffer L1041, via the error image concealing unit R1060.

This makes the output image for the right eye and the output image for the left eye become identical to each other, but makes it possible to prevent a situation in which an image is lost or an image including an error is displayed.

Furthermore, Patent Reference 2 (Japanese Laid-open Patent Application Publication No. 7-322302) discloses error concealment by copying a previous image of a channel in which an error is found.

In FIG. 16, the arrow from the buffer 1040 (the decoded image buffer L1041 and the decoded image buffer R1042) to the decoding unit 1010 shows that decoded images are referred to in inter decoding of a coded video stream.

SUMMARY OF THE INVENTION

However, the aforementioned conventional multiview video decoding apparatus entails a problem that the apparatus may cause a viewer of output images including an error to feel uncomfortable in the case where an error occurs in the decoding of multi-channel video streams that are multiview coded to have a reference relationship.

Each of FIG. 1 and FIG. 2 is a diagram illustrating a problem of the multiview video decoding apparatus according to the conventional art.

More specifically, FIG. 1 shows output images in the case where an error is concealed using the apparatus disclosed in the aforementioned Patent Reference 1.

The classifications of an upper sequence and a lower sequence, decoded images from L-1 to L-6 and R-1 to R-6, and an underline and solid arrows are the same as in FIG. 15, and thus the same descriptions are not repeated here.

As shown in FIG. 1, in the case where an error is detected in R-2 to be decoded in the R-channel coded video stream among the multi-channel coded video streams, L-2 is copied by the error image concealing unit R1060 as shown in FIG. 16 and is output as an output image for the R channel.

Subsequently, R-3 and R-4 that are R-channel decoded images before intra coded L-5 are not used, and output images from the error image concealing unit R1060 are sequentially used. In other words, L-2, L-3, and L-4 are output as output images for the R channel instead of R-2, R-3, and R-4. Here, if R-2, R-3, and R-4 enclosed by dotted lines do not include any error, these images are decoded accurately, and represent expected output images.

In this way, when an error is detected in the R-channel side image, outputting an image at the other channel instead disables three-dimensional display at a moment resulting in a two-dimensional display, and then re-enables three-dimensional display after time elapses. In other words, three-dimensional display is switched to two-dimensional display and then re-switched to three-dimensional display, which may cause the viewer of the output images to feel uncomfortable.

In addition, FIG. 2 shows output images in the case where an error is concealed using the apparatus disclosed in the aforementioned Patent Reference 2.

As shown in the diagram, in the case where an error is detected in a coded image L-2 to be decoded in the L-channel coded video stream among the multi-channel coded video streams, the decoded image L-2 including the error is not used, and a decoded image L-1 that is a previous output image of the same L channel is output as an output image for the left eye. Since a previous image and a current image are similar to each other in most cases, it is possible to perform error concealment that achieves a satisfactory image quality in this way.

In the case where no error is detected after L-3 in the L-channel coded video stream at the L-channel side, L-3 and the following images are decoded normally. In addition, the R-channel coded video stream that may refer to a decoded image of L-2 is also decoded normally after R-2.

However, in the case where the MVC inter coding in Non-Patent Reference 1 is used as a coding method, L-3 inevitably refers to L-1 instead of referring to L-2 that should be originally referred to. This makes it impossible to generate accurate output images even though the coded data itself does not include any error. The L-3 in this case is referred to as L-3'. Likewise, L-4 that refers to the inaccurate L-3' does not result in an accurate output image. The L-4 in this case is referred to as L-4'.

In addition, in the case where coded video streams having one of the features of MVC which is allowing reference from the R channel (dependent view side) to the L channel (base view side) are decoded, the R-channel side also refers to L-1 instead of referring to L-2 that should be originally referred to. This makes it impossible to generate accurate output images even though the coded data itself does not include any error. The R-2 in this case is referred to R-2'.

Likewise, R-3 that refers to the inaccurate R-2' does not result in an accurate output image. The R-3 in this case is referred to as R-3'. Likewise, R-4 that refers to the inaccurate R-3' does not result in an accurate output image. The R-4 in this case is referred to as R-4'.

These output images include noise generated by reference to the inaccurate reference images. Here, L-2, L-3, L-4, R-2, R-3, and R-4 enclosed by dotted lines are decoded accurately if no error is included, and represent expected output images.

In addition, the noise sequence continues to the image immediately before L-5 intra coded without reference to a previous image, and thus an accurate output image can be re-generated when L-5 appears.

In this way, if a left-eye image and a right-eye image are almost identical to each other, the apparatus disclosed in Patent Reference 1 can perform error concealment without causing any problem.

However, in many cases, a general three-dimensional video includes a large difference between left and right images in order to make three-dimensional display clearer and easier to recognize. For this reason, merely copying an image for the eye (viewpoint) other than the eye for which an error-source image is detected and using the copy as a replacement does not mean completion of sufficient error concealment.

The error concealment method that is disclosed in Patent Reference 2 as being for error concealment by copying a previous image at a channel at which an error occurs is effective when only a small difference is found between a previous image and a current image. However, the error concealment method does not achieve a satisfactory concealment result in the case of previous and current images between which a large difference is found, that is, between which a large motion is found.

Due to reference to inaccurate reference images, noise is continuously included in L-channel output images until an intra coded L-5 is decoded. This may not only disable the user to visually recognize the three-dimensional images, but also make the viewer of the output images feel uncomfortable.

In addition, in the case where an R channel (dependent view) and an L channel (base view) between which the aforementioned one of the features of MVC is observed have an inter-channel reference relationship such that a decoded image in an L-channel coded video stream is referred to in the decoding of an image in an associated R-channel coded video stream, Patent Reference 1 entails a problem of not allowing the decoding of the R-channel coded video stream by replacing the image of the R-channel coded video stream using the L-channel decoded image.

As described above, the aforementioned conventional art entails a problem of having a possibility of causing a viewer of output images including an error to feel uncomfortable in the case where the error occurs in the decoding of multi-channel video streams that are multiview coded to have a reference relationship.

The present invention conceived in view of the aforementioned problem has an object to provide a multiview video decoding apparatus, a multiview video decoding method, a multiview video decoding program, and a multiview video decoding integrated circuit which, even in the case where an error occurs in the decoding of coded multi-channel video streams that are mutiview coded to have a mutual reference relationship, rarely cause a trouble in recognition of the content of images of the coded video streams and which, even in this case, makes it possible to reduce the influence of an error on human visual recognition as much as possible.

In order to solve the aforementioned problem, a multiview video decoding apparatus according to the present invention decodes a plurality of coded videos generated by coding videos from a plurality of viewpoints, and includes: a decoding unit configured to decode one of the coded videos without reference to a decoded image included in an other one of the coded videos to generate one of decoded videos which is composed of a plurality of decoded images, and decode the other one of the coded videos with reference to a decoded image included in the one of the decoded videos to generate an other one of the decoded videos; an error detecting unit configured to detect an error-source image which is a decoded image including an error, from among the decoded images included in either the one of the decoded videos or the other one of the decoded videos; and a decoded image replacing unit configured to: replace the detected error-source image with a first decoded image which does not include an error, the detected error-source image being included in a first decoded video which is either the one of the decoded videos or the other one of the decoded videos; and replace an associated error image with a second decoded image, the associated error image being (i) included in a second decoded video which is other than the first decoded video including the error-source image and (ii) displayed in association with the error-source image, wherein the decoded image replacing unit is configured to: replace, without using the second decoded video, the error-source image with the first decoded image which is generated using a previous image which is a decoded image included in the first decoded video decoded before the decoding of the error-source image; and replace, without using the first decoded video, the associated error image with the second decoded image which is generated using an associated previous image which is a decoded image included in the second decoded video and displayed in association with the previous image included in the first decoded video.

In this way, the multiview video decoding apparatus detects an error-source image from among the decoded images included in the decoded videos, and replaces the error-source image and the associated error image using a previous image and an associated previous image which do not include any error. For this reason, it is possible to output error-free images even when one of the input coded videos include an error.

Here, a replacement of only the error-source image with an error-free image in order to remove the error in the error-source image breaks the balance between decoded videos. For example, in the case of displaying a three-dimensional (3D) image, a breakage of the balance between a right-eye image and a left-eye image causes a trouble in the recognition of the content of the resulting image by significantly affecting human visual recognition. For this reason, in order to prevent the breakage of the balance between the decoded videos, the error-source image and the associated error image are replaced using the previous image and the associated previous image, respectively.

In this way, it is possible to reduce the possibility of causing the trouble in the recognition of the content of the images of coded multi-channel video streams which are multiview coded to have a mutual reference relationship, and to reduce, as much as possible, the influence of the error on the human visual recognition, even when the error occurs in the decoding of the coded video streams.

In addition, preferably, the decoded image replacing unit is configured to: replace the error-source image with the first decoded image generated using the previous image which is displayed immediately before the error-source image and does not include an error; and replace the associated error image with the second decoded image generated using the associated previous image displayed in association with the previous image.

In this way, the decoded image replacing unit replaces the error-source image using the previous image that is displayed immediately before the error-source image and does not include any error, and replaces the associated previous image that is displayed in association with the previous image using the associated error image. Since the image replacement is performed using the image immediately before the error-source image and the image immediately before the associated error image, it is possible to reduce the possibility of causing a trouble in the recognition of the content of the images, and to reduce the influence of the error on the human visual recognition as much as possible.

In addition, preferably, the decoded image replacing unit is configured to: replace the error image with the first decoded image which is the previous image; and replace the associated error image with the second decoded image which is the associated previous image.

In this way, the decoded image replacing unit replaces the error-source image with the previous image, and replaces the associated error image with the associated previous image. Since the previous image and the associated previous image are output and displayed instead of the error-source image and the associated error image, it is possible to reduce the possibility of causing a trouble in the recognition of the content of the images, and to reduce the influence of the error on the human visual recognition as much as possible.

In addition, preferably, the decoded image replacing unit is configured to: replace, using the previous image, decoded error images which are decoded images included in the first decoded video and displayed inclusively between the error-source image and either an immediately-before decoded image or the decoded image which is displayed in association with the immediately-before decoded image, the immediately-before decoded image being a decoded image immediately before the decoded image generated by decoding an intra coded image included in the one of the coded videos before being decoded into the one of the decoded videos; and replace, using the associated previous image, decoded associated error images which are decoded images included in the second decoded video and displayed in association with the respective decoded error images.

In this way, the decoded image replacing unit replaces, using the previous image, the decoded error images that are displayed inclusively between the error-source image and the decoded image immediately before the decoded image generated by decoding an intra coded image, and replaces the decoded associated error images using the associated previous image. In other words, after the occurrence of the error, the error concealment is continued until an intra coded image appears in the coded video stream at the base view side. Here, the intra coded image is an image that is decoded without reference to any other image, and thus rarely includes an error. Therefore, it is unlikely that the images following the intra coded image includes an error. For this reason, the error concealment continued until the intra coded image appears makes it possible to reduce the possibility of causing a trouble in the recognition of the content of the images and reducing the influence of the error on the human visual recognition as much as possible.

In addition, preferably, the decoded image replacing unit is configured to: replace the decoded error images using the previous image when the intra coded image is an Instantaneous Decoding Refresh (IDR) picture that is a starting picture of an image sequence; and replace the decoded associated error images using the associated previous image.

In this way, when the intra coded image is the Instantaneous Decoding Refresh (IDR) picture, the decoded image replacing unit replaces the decoded error images and the decoded associated error images with the IDR picture. In other words, after the occurrence of the error, the error concealment is continued until the IDR picture appears in the coded video stream at the base view side. Here, the IDR picture is a picture which is the starting picture of an image sequence, and at which all pieces of information necessary for decoding are reset. For this reason, the IDR picture is most unlikely to include an error among intra coded images. Therefore, it is unlikely that the images following the IDR image includes an error. For this reason, the error concealment continued until the IDR picture appears makes it possible to reduce the possibility of causing a trouble in the recognition of the content of the images and reducing the influence of the error on the human visual recognition as much as possible.

In addition, preferably, the decoded image replacing unit is configured to: replace the decoded error images using the previous image, when the immediately-before decoded image is a decoded image immediately before a decoded image generated by decoding the intra coded image which is generated in the case where no error is included in any of the decoded image generated by decoding the intra coded image and the decoded image which is displayed in association with the decoded image resulting from the intra coded image; and replace the decoded associated error images using the associated previous image.

In this way, the decoded error images and the decoded associated error images are replaced until the appearance of the error-free decoded image generated by decoding the intra coded image and the appearance of the error-free decoded image that is displayed in association with the decoded image. The error concealment continued while errors are found makes it possible to reduce the possibility of causing a trouble in the recognition of the content of the images and reducing the influence of the error on the human visual recognition as much as possible.

In addition, preferably, the decoding image replacing unit is configured to: replace a plurality of decoded images included in the decoded error images with the first decoded image generated using the previous image, when replacing the decoded error images; and replace a plurality of decoded images included in the decoded associated error images with the second decoded image generated using the associated previous image, when replacing the decoded associated error images.

In this way, the decoded image replacing unit replaces the decoded images included in the decoded error images with the image generated using the previous image, and replaces the decoded images included in the decoded associated error images with the image generated using the associated previous image. In other words, concealing the errors by replacing the decoded images with the same images makes it possible to remove the unnaturalness caused when a totally different image is suddenly displayed. For this reason, such error concealment makes it possible to reduce the possibility of causing a trouble in the recognition of the content of the images and reducing the influence of the error on the human visual recognition as much as possible.

In addition, preferably, the decoded image replacing unit is configured to: replace the error image with the first decoded image generated using the previous image; and replace the associated error image displayed at a substantially same display time as a display time of the error image with the second decoded image generated using the associated previous image which is displayed at a substantially same display time as a display time of the previous image.

In this way, the error-source image and the associated error image are displayed at substantially the same time, and are replaced using the previous image and the associated previous image that are displayed at substantially the same time. For this reason, for example, in a 3D image in which right-eye images and corresponding left-eye images are displayed at substantially the same time, it is possible to reduce the possibility of causing a trouble in the recognition of the content of the images and reducing the influence of the error on the human visual recognition as much as possible.

In addition, preferably, the decoding unit is configured to decode the one of the coded videos which is a coded video for a left eye to generate the one of the decoded videos, and decode the other one of the coded videos which is a coded video for a right eye to generate the other one of the decoded videos, the one of the coded videos and the other one of the coded videos being two coded videos which are the coded videos generated by coding the videos from the viewpoints that are a left-eye viewpoint and a right-eye viewpoint, the error detecting unit is configured to detect the error image from among the decoded images included in either the one of the decoded videos and the other one of the decoded videos, and the decoded image replacing unit is configured to replace the error image with the first decoded image, and replace the associated error image with the second decoded image.

In this way, in the case where the error is included in one of the left-eye image and the right-eye image, the error is concealed. For this reason, in a 3D image in which right-eye images and corresponding left-eye images are included, it is possible to reduce the possibility of causing a trouble in the recognition of the content of the images and reducing the influence of the error on the human visual recognition as much as possible.

It is to be noted that the present invention can be implemented not only as the mutliview video decoding apparatus as described above, but also as a method that is for controlling the multiview video decoding apparatus and includes the steps corresponding to the unique units of the multiview video decoding apparatus and/or a multiview video decoding method that includes the steps corresponding to the unique units of the multiview video decoding apparatus, and as a program causing a computer to execute these unique steps of the method(s). The program can naturally be distributed through the recording media such as CD-ROMs etc. or the transmission media such as the Internet.

Furthermore, all or some of the functions of the multiview video decoding apparatus according to the present invention can be implemented in form of a single or plural semiconductor integrated circuit(s) (LSI(s)), and as a three-dimensional image display system including the multiview video decoding apparatus.

In this way, the multiview video decoding apparatus according to the present invention makes it possible to reduce the possibility of causing a trouble in recognition of the content of the images of multi-channel coded video streams which are multiview coded to have a reference relationship between the multi-channels and reducing the influence of an error on the human visual recognition as much as possible, even when the error occurs in the decoding of the coded video streams.

Further Information about Technical Background to This Application

The disclosure of Japanese Patent Application No. 2009-284534 filed on Dec. 15, 2009 including specification, drawings and claims is incorporated herein by reference in its entirety.

The disclosure of PCT application No. PCT/JP2010/003424 filed on May 21, 2010, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 14B is a diagram illustrating MVC according to the conventional art;

DESCRIPTION OF THE PREFERRED EMBODIMENTS

Hereinafter, embodiments of a multiview video decoding apparatus according to the present invention will be described with reference to the drawings.

Here, prior to explanation of the multiview video decoding apparatus according to an embodiment of the present invention, a description is given of a method of configuring multi-channel coded video streams that are processing targets in a decoding process performed by the multiview video decoding apparatus.

In general, the multi-channel coded video streams are generated by coding and multiplexing, according to a predetermined method, multi-channel videos generated by capturing images of a subject in a plurality of directions.

The following descriptions are given assuming that multi-channel coded video streams based on Multiview Video Coding (MVC) are input according to a coding method conforming to H.264 defined by Non-Patent Reference 1 that is the International Telecommunication Union Telecommunication Standardization Sector (ITU-T) Recommendations (issued in March, 2009). Here, each of the streams may be configured with NAL units conforming to H.264, or may be configured with the other units such as GOPs (Group Of Pictures), sequences, and pictures all defined in the various video coding standards.

In the MVC-based coding here, a reference channel (base view side channel) is prepared, and the reference channel is coded normally. It is possible to code the remaining channels (dependent view side channels) other than the reference channel by performing normal coding therefor in the same manner as for the reference channel or by performing coding therefor with reference to decoded images that have substantially the same display time at the reference channel side.

(Embodiment 1)

The following describes a multiview video decoding apparatus according to Embodiment 1 of the present invention.

Here, it is assumed in Embodiment 1 that the number of channels of the multiview coded video streams that are input to the multiview video decoding apparatus are multi-channel coded video streams of two channels that are an L-channel for the left eye and an R-channel for the right eye.

Figure 1:
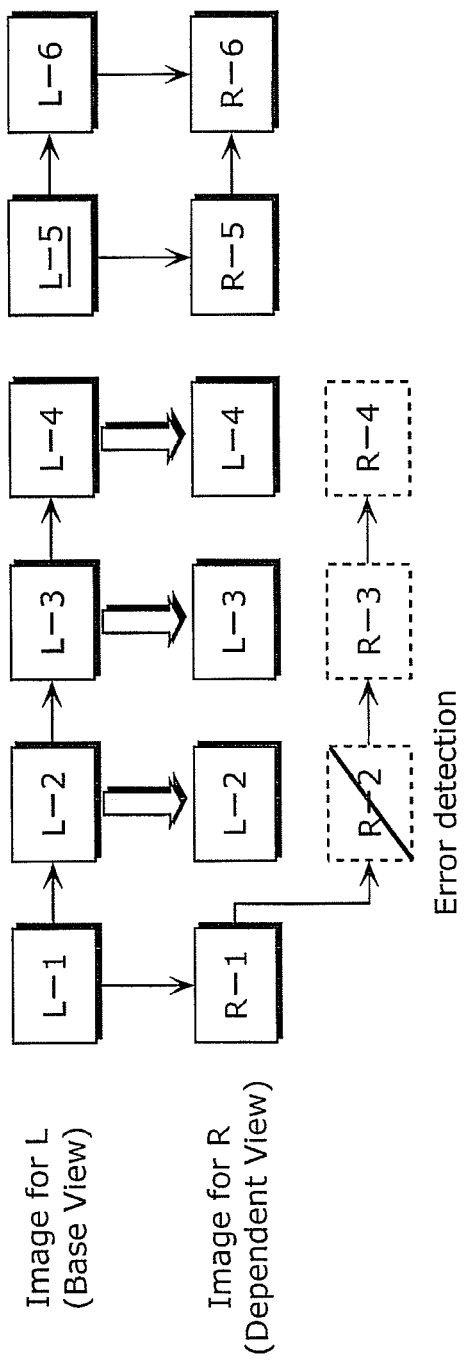
FIG. 1 is a diagram illustrating a problem of a multiview video decoding apparatus according to the conventional art.
Figure 2:
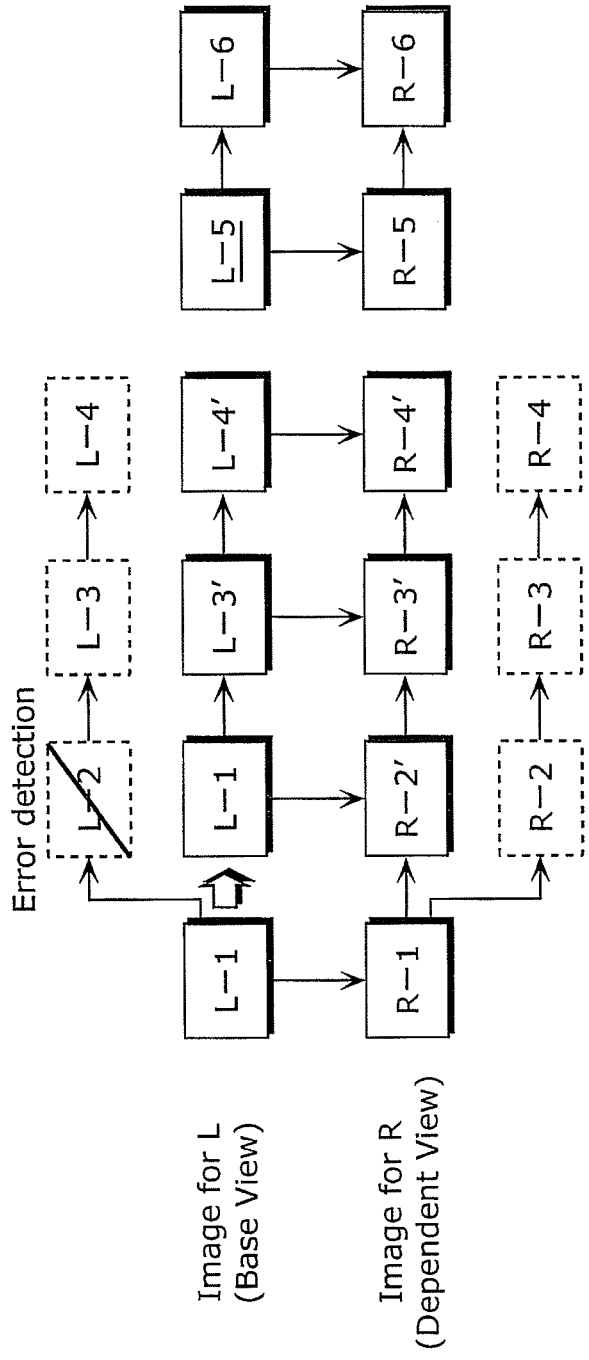
FIG. 2 is a diagram illustrating a problem of the multiview video decoding apparatus according to the conventional art.
Figure 3:
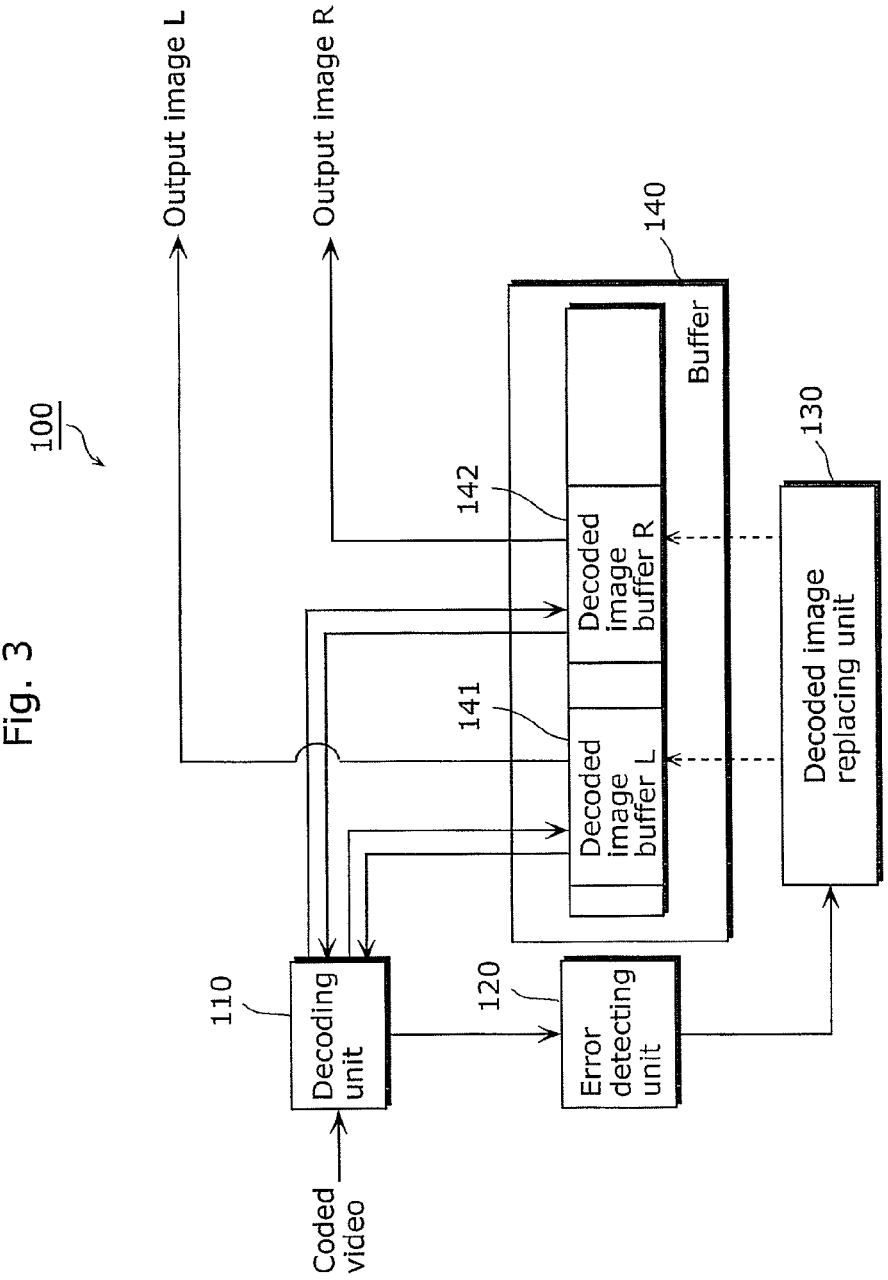
FIG. 3 is a block diagram of a structure of a multiview video decoding apparatus according to Embodiment 1 of the present invention.

FIG. 3 is a block diagram of a structure of a multiview video decoding apparatus 100 according to Embodiment 1 of the present invention.

The multiview video decoding apparatus 100 is an apparatus which decodes a plurality of coded videos generated by coding videos from a plurality of viewpoints. More specifically, the multiview video decoding apparatus 100 is an apparatus which decodes a plurality of coded video streams multiview coded to have a mutual reference relationship. As shown in the diagram, the multiview video decoding apparatus 100 includes a decoding unit 110, an error detecting unit 120, a decoded image replacing unit 130, and a buffer 140.

The buffer 140 is a memory which stores decoded images. The buffer 140 includes a decoded image buffer L141 and a decoded image buffer R142. The decoded image buffer L141 stores images for L that are decoded images for the left eye. The decoded image buffer R142 stores images for R that are decoded images for the right eye.

The decoding unit 110 decodes one of the coded videos without reference to any decoded image in an other one of the coded videos to generate one of decoded videos which is composed of a plurality of decoded images, and decodes the other one of the coded videos with reference to decoded images in the one of the decoded videos to generate an other one of decoded videos.

Here, the decoding unit 110 decodes the one of the coded videos which is a coded video for the left eye among the two coded videos generated by coding videos from a left-eye viewpoint and from a right-eye viewpoint, to generate the one of the decoded videos, and decodes the other one of the coded videos which is a coded video for the right eye, to generate the other one of the decoded videos.

More specifically, the decoding unit 110 decodes the coded video stream for L at the base view side channel among the two-channel coded video streams without reference to any decoded image of the coded video stream for R at the dependent view side channel to generate images for L that are a plurality of decoded images, and decodes the coded video stream for R with reference to decoded images included in the images for L to generate the images for R.

Furthermore, the decoding unit 110 decodes the multi-channel coded video streams input to the decoding unit 110, and outputs the decoded images. The decoding unit 110 stores the output decoded images to the buffer 140. In other words, the decoding unit 110 stores the images for L into the decoded image buffer L141, and stores the images for R into the decoded image buffer R142, separately.

Here, in the case of a P-picture and a B-picture which is inter coded and requires a decoded image(s) when being decoded, the decoding unit 110 refers to decoded images stored in either the decoded image buffer L141 or the decoded image buffer R142. As shown in FIG. 3, each of the arrows from the decoded image buffer L141 and the decoded image buffer R142 shows obtainment of a reference image.

Here, each of the decoded image buffer L141 and the decoded image buffer R142 can store a plurality of decoded images, not only a single image. In addition, H.264 defines that a single picture is composed of a plurality of slices.

In addition, the buffer 140 may be configured with external memories, or as internal memories. In addition, the decoded image buffer L141 and the decoded image buffer R142 may be provided on a physically same memory, or may be configured as separate memories.

The error detecting unit 120 detects an error-source image that is a decoded image including an error, from among the decoded images included in either the one of the decoded videos or the other one of the decoded videos. In other words, the error detecting unit 120 detects an error-source image from among the decoded images included in either the images for L or the images for R.

More specifically, the error detecting unit 120 detects the error-source image by detecting the error included in the input coded video streams, based on the result of decoding by the decoding unit 110. Here, the error detecting unit 120 does not need to always detect the error-source image based on the result of decoding by the decoding unit 110, and may detect the error-source image by detecting an error in one of the input coded video streams.

Here, examples of such an error include: errors such as a bit reverse, a bit loss, or a bit inclusion are included in the coded video streams; and errors in syntax (rules indicating setting rules such as the order of image information and a coded data sequence). In other words, an error that occurs when coded video streams are input from an optical disc, a hard disc, or the like, are transmitted using a wireless communication, or are subjected to streaming distribution shows that the decoding unit 110 cannot output accurate decoded images due to a bit reverse, a bit loss, a bit inclusion, or the like that occurs before the coded video streams reach the decoding unit 110.

The decoded image replacing unit 130 replaces the error-source image detected by the error detecting unit 120 with a first decoded image that does not include any error, and replaces an associated error image with the second decoded image. Here, the associated error image is (i) included in the second decoded video that is other than the first decoded video that includes the error-source image, and (ii) displayed in association with the error-source image.

To put it differently, the decoded image replacing unit 130 replaces the error-source image with the first decoded image without using the second decoded image, and replaces the associated error image with the second decoded image without using the first decoded image. Here, the first decoded image is generated using a previous decoded image included in the first decoded video decoded prior to the error-source image, and the second decoded image is generated using the decoded associated previous image that is included in the second decoded video and displayed in association with the previous image.

Here, the previous image is an image that is displayed immediately before the error-source image and does not include any error. In addition, the error-source image and the associated error image are displayed at substantially the same time, and the previous image and the associated previous image are displayed at substantially the same time.

More specifically, the decoded image replacing unit 130 replaces the error-source image with the first decoded image assuming that the previous image is the first decoded image, and replaces the associated previous image with the second decoded image assuming that the associated previous image is the second decoded image.

In addition, the decoded image replacing unit 130 replaces, using the previous image, the decoded error images that are included in the first decoded video and displayed inclusively between the error-source image and either an image immediately before the image generated by decoding an intra coded image or the decoded image that is displayed in association with the immediately-before image, and replaces, using the associated previous image, the decoded associated error images that are included in the second decoded video and displayed in association with the respective decoded error images.

More specifically, the immediately-before image is the decoded image immediately before the decoded image generated by decoding an intra coded image included in the coded video before being decoded into the one of the decoded videos. More specifically, the immediately-before image is the decoded image immediately before the decoded image generated by decoding an intra coded image in the case where no error is included in any of the decoded image generated by decoding the intra coded image and the decoded image that is displayed in association with the decoded image.

Subsequently, the decoded image replacing unit 130 replaces the decoded images included in the decoded error images with the first decoded image that is generated using the previous image, and replaces the decoded images included in the decoded associated error images with the second decoded image that is generated using the associated previous image.

The processes performed by the decoded image replacing unit 130 are described in further detail below.

In the case where no error is detected by the error detecting unit 120, the decoded image replacing unit 130 causes the images for L stored in the decoded image buffer L141 and the images for R stored in the decoded image buffer R142 to be output as output images L and output images R, respectively. Here, the output images L and the output images R are output images for the L channel and output images for the R channel, respectively.

These output images may be output immediately after being decoded, and reference decoded images etc. may be output after a certain number of images are output. Such output timings are defined by H.264 by ITU-T or Motion Picture Cording Expert Group (MPEG); ISO11172 (MPEG-1), ISO13818 (MPEG-2)), etc. Output timings are recorded in coded video streams, and output images are output according to the output order or output timings.

Although Embodiment 1 describes that output images are output immediately after being decoded, output timings are not limited thereto. In addition, the output images L and the output images R may be directly output to an external display apparatus. Alternatively, the output images L and the output images R may be saved in separate memories, be subjected to image-quality enhancement process using an image filter, and then be output to a display apparatus.

In addition, the decoded image replacing unit 130 causes output images to be output for error image concealment, in the case where an error-source image is detected by the error detecting unit 120.

More specifically, in the case where the error detecting unit 120 detects some error in the L-channel coded video stream in the decoding by the decoding unit 110, the L-channel decoded images output from the decoding unit 110 include the error. In this case, the decoding unit 110 may determine that the decoding is impossible and stop the decoding operation.

In this case, the decoding unit 110 notifies the error detecting unit 120 of the detection of the error. Upon receiving the error notification, the error detecting unit 120 outputs an instruction for causing error concealment to be performed on the error image(s), to the decoded image replacing unit 130.

Upon receiving the instruction for causing the error concealment, the decoded image replacing unit 130 outputs an instruction for causing images for L previously decoded and stored in the decoded image buffer L141 to be output as output images L for the L channel. In addition, the decoded image replacing unit 130 outputs an instruction for causing images for R previously decoded and stored in the decoded image buffer R142 to be output as output images R for R channel.

Figure 15:
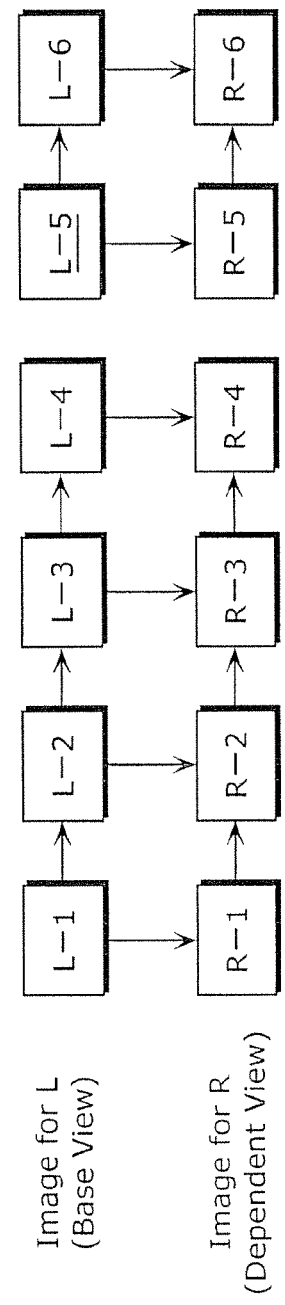
FIG. 15 is a diagram illustrating coded video streams in the conventional art coded according to the MVC Standard.
Figure 16:
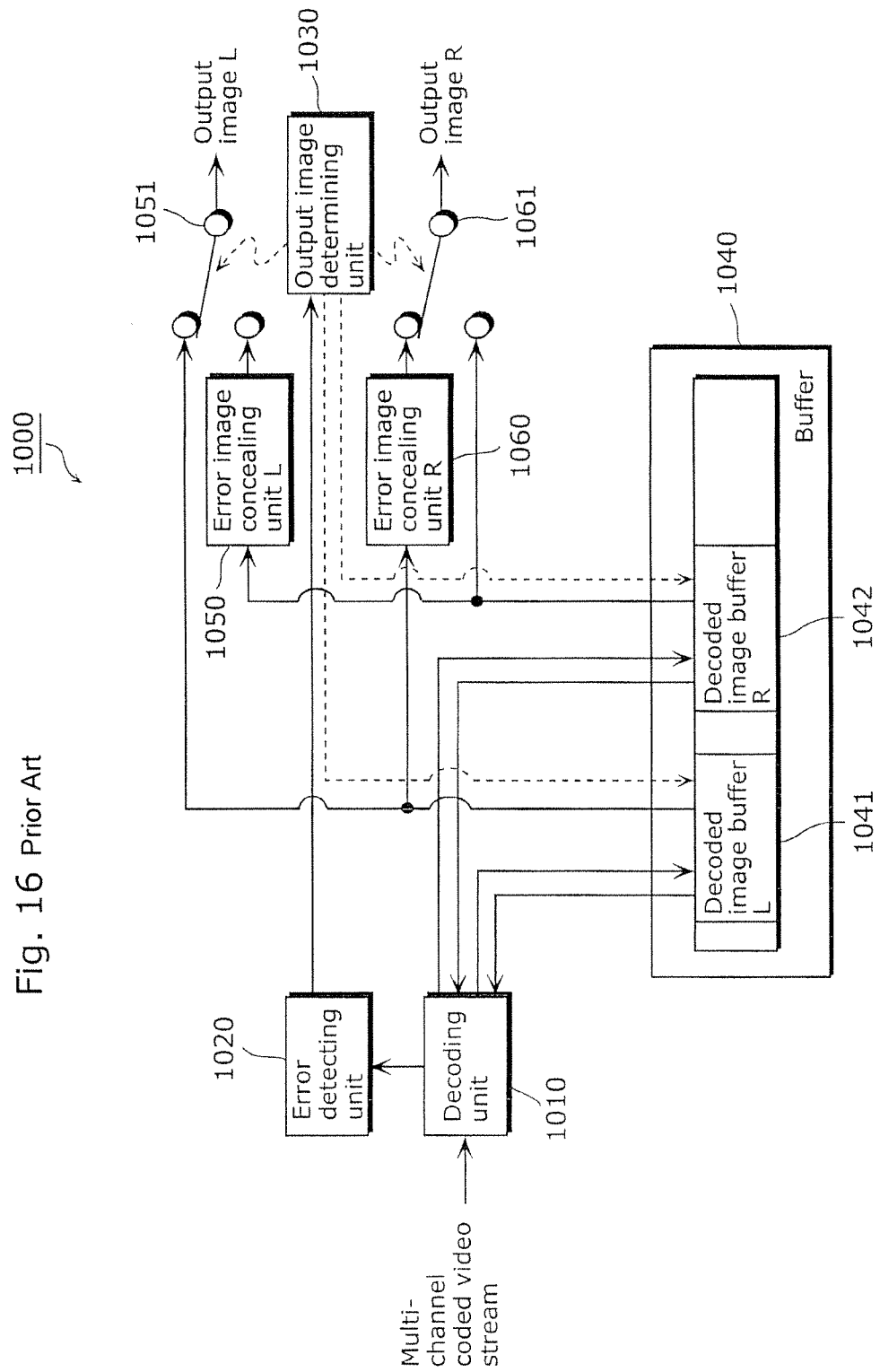
FIG. 16 is a block diagram of a structure of a multiview video decoding apparatus according to the conventional art.

Here, the decoded previous images for R and the respectively-corresponding decoded previous images for L have substantially the same display times in display order recorded in the streams. Examples of such images for L and images for R include images for L each of which is located at a given position and is assigned with a numerical sign indicating a display order and images for R each of which is located in association with a corresponding one of the images for L and is assigned with the same numerical sign as that of the corresponding image for L as shown in FIG. 15.

In this case, according to an aspect of the present invention, each output image L corresponds to the "first decoded image", and each output image R corresponds to the "second decoded image". In addition, according to the aspect of the present invention, each decoded previous image L corresponds to the "previous image", and each decoded previous image R corresponds to the "associated previous image".

Here, in the case where the error detecting unit 120 detects some error in the R-channel coded video stream in the decoding by the decoding unit 110, the R-channel decoded images output from the decoding unit 110 include the error. In this case, the decoding unit 110 may alternatively determine that the decoding is impossible and stop the decoding operation.

In this case, the decoding unit 110 notifies the error detecting unit 120 of the detection of the error. Upon receiving the error notification, the error detecting unit 120 outputs an instruction for causing error concealment to be performed on the error images to the decoded image replacing unit 130.

Upon receiving the instruction for causing the error concealment, the decoded image replacing unit 130 outputs an instruction for causing images for R previously decoded and stored in the decoded image buffer R142 to be output as output images R for R channel. In addition, the decoded image replacing unit 130 outputs an instruction for causing images for L previously decoded and stored in the decoded image buffer L141 to be output also as output images L for the L channel.

Here, the decoded previous images for R and the respectively-corresponding decoded previous images for L have substantially the same display times in display order recorded in the streams.

In this case, according to an aspect of the present invention, each output image R corresponds to the "first decoded image", and each output image L corresponds to the "second decoded image". In addition, according to the aspect of the present invention, each decoded previous image for R corresponds to the "previous image", and each decoded previous image for L corresponds to the "associated previous image".

Likewise, in the case where the error detecting unit 120 detects some error in both the L-channel coded video stream and the R-channel coded video stream in the decoding by the decoding unit 110, the L-channel and R-channel decoded images output from the decoding unit 110 include the error. In this case, the decoding unit 110 may alternatively determine that the decoding is impossible and stop the decoding operation.

In this case, the decoding unit 110 notifies the error detecting unit 120 of the detection of the error. Upon receiving the error notification, the error detecting unit 120 outputs an instruction for causing error concealment to be performed on the error images to the decoded image replacing unit 130.

Upon receiving the instruction for causing the error concealment, the decoded image replacing unit 130 outputs an instruction for causing the images for L previously decoded and stored in the decoded image buffer L141 and the images for R previously decoded and stored in the decoded image buffer R142 to be output respectively as the output images L for the L channel and the output images R for the R channel.

Here, the decoded previous images for R and the respectively-corresponding decoded previous images for L have substantially the same display times in display order recorded in the streams.

In this case, according to an aspect of the present invention, each output image L corresponds to one of the "first decoded image" and the "second decoded image", and each output image R corresponds to the other one of the "first decoded image" and the "second decoded image". In addition, according to the aspect of the present invention, each decoded previous image for L corresponds to one of the "previous image" and the "associated previous image", and each decoded previous image for R corresponds to the other one of the "previous image" and the "associated previous image".

Next, a description is given of the decoding procedure taken by the multiview video decoding apparatus 100.

Figure 4:
FIG. 4 is a flowchart of decoding processes performed by the multiview video decoding apparatus according to Embodiment 1 of the present invention.

FIG. 4 is a flowchart of decoding processes performed by the multiview video decoding apparatus 100 according to Embodiment 1 of the present invention.

First, a plurality of multi-channel coded video streams that is a plurality of coded videos is input to the decoding unit 110 (S102).

The decoding unit 110 decodes the coded videos to generate a plurality of decoded videos (S104).

The error detecting unit 120 determines whether or not an error-source image is detected in the decoded images included in the L-channel side decoded video (S106).

The error detecting unit 120 determines whether or not an error-source image is detected in the decoded images included in the R-channel side decoded video (S108) in the case where no error-source image is detected in the L-channel side decoded video (No in S106).

In the case where the error detecting unit 120 detects an error-source image in the L-channel side decoded video (YES in S106) or detects an error-source image in the R-channel side decoded video (YES in S108), the decoded image replacing unit 130 replaces the error-source image and the associated error image with the previous image and the associated previous image at each of the L-channel and R-channel sides, and outputs the replacements (S110).

More specifically, the decoded image replacing unit 130 judges whether or not an error is detected in either the L-channel side image or the R-channel side image, based on the error detection information from the error detecting unit 120, and outputs an instruction for causing, at each of the L-channel and R-channel sides, the images that are previously decoded and have substantially the same display times to be output from the decoded image buffer L141 and the decoded image buffer R142.

It is to be noted that, even in the case where an error is detected in each of the L-channel side and the R-channel side, the same processing is performed (S110).

Subsequently, the decoding unit 110 determines whether or not a next current image in the L-channel side coded video stream is composed of intra coded images, and determines whether or not the error detecting unit 120 does not detect an error in each of the images of the L- and R-channel side coded video streams and thus whether or not accurate decoding is possible.

In the case where the decoding unit 110 determines that the L-channel side video is composed of intra coded images, and each of the L- and R-channel side videos does not include any error (YES in S112), the decoding unit 110 completes the decoding of the desired image at each of the L- and R-channel sides. After the completion, the decoded image replacing unit 130 causes the decoded images to be output from the decoded image buffer L141 and the decoded image buffer R142 (S116).

In the case where the decoding unit 110 determines that the L-channel side video is not composed of intra coded images, and one of the L- or R-channel side videos includes an error (NO in S112), the decoding unit 110 replaces the current L-channel side image and the current R-channel side image with the previous image and the associated previous image, respectively, and outputs the replacements (S114).

The decoding unit 110 repeats the process (S114) of replacing the current L-channel side image and the current R-channel side image with the previous image and the associated previous image, respectively, and outputting the replacements until when the following conditions are satisfied: the L-channel side video is composed of intra coded images; and each of the L-channel side image and the R-channel side video does not include any error. There is a case where the processing is completed when the inputs of the coded video streams are completed, but this case is not shown in the drawings.

In the case where the error detecting unit 120 does not detect an error-source image in the R-channel decoded video (NO in S108), the decoding unit 110 completes the decoding of the desired image at each of the L- and R-channel sides. After the completion, the decoded image replacing unit 130 causes the decoded images to be output from the decoded image buffer L141 and the decoded image buffer R142 (S116).

It is to be noted that the intra coded image may be an Instantaneous Decoding Refresh (IDR) picture in H.264. The IDR picture is a starting picture in an image sequence.

An IDR picture disables reference to the reference pictures stored in the decoded image buffer L141 and the decoded image buffer R142 before the IDR picture appears. Thus, when each of the L- and R-channel side images does not include any error, there is little possibility that an error is included in the IDR picture and the following pictures. For this reason, when the intra coded picture is an IDR picture, since the following pictures do not refer to the images decoded before the IDR picture, it is possible to reliably reduce the possibility that an error is included.

This is the completion of a set of decoding processes performed by the multiview video decoding apparatus 100 according to Embodiment 1.

Next, a description is given of operations performed by the multiview video decoding apparatus 100 according to Embodiment 1 based on the above-described structure and flowcharts.

Figure 5:
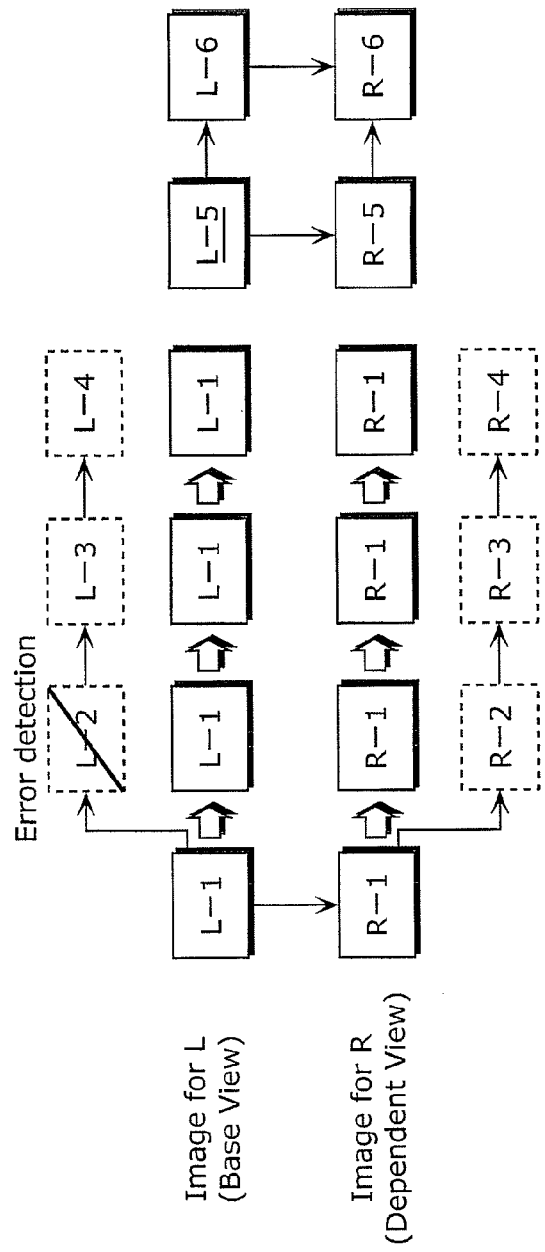
FIG. 5 is a diagram showing output images output by the multiview video decoding apparatus according to Embodiment 1 of the present invention.
Figure 6:
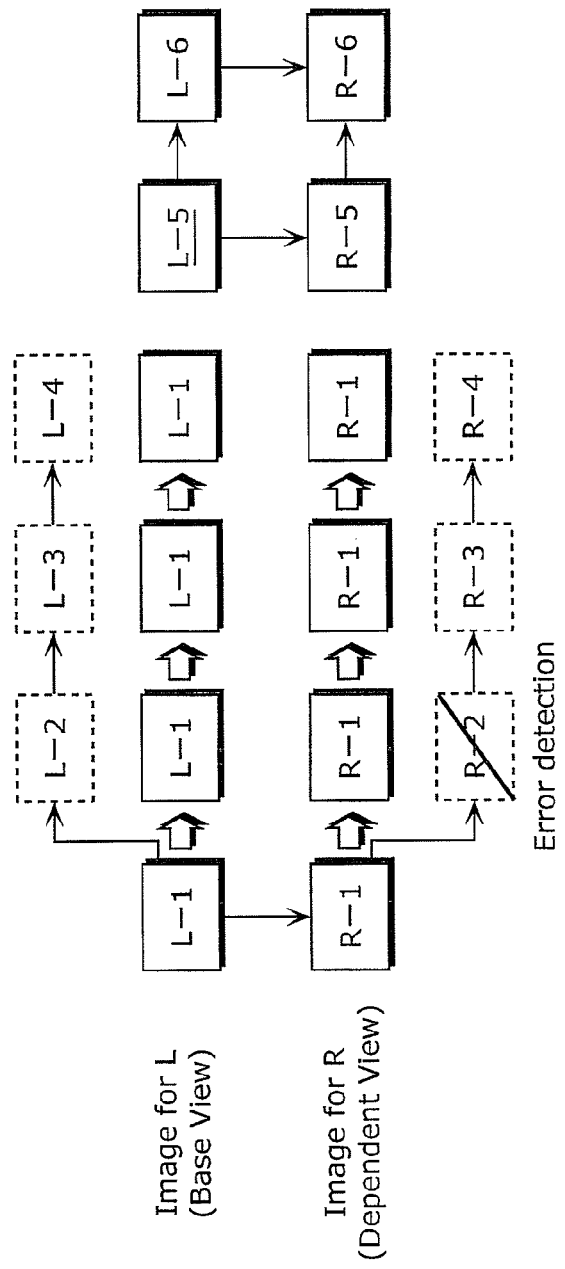
FIG. 6 is a diagram showing output images output by the multiview video decoding apparatus according to Embodiment 1 of the present invention.
Figure 7:
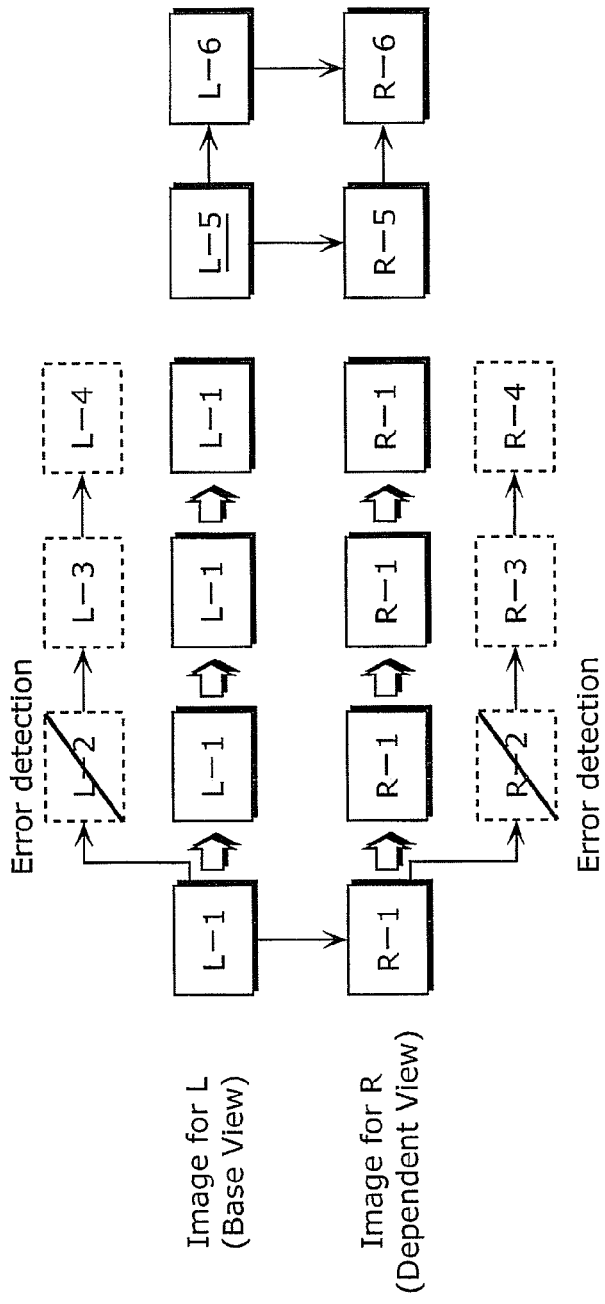
FIG. 7 is a diagram showing output images output by the multiview video decoding apparatus according to Embodiment 1 of the present invention.

Each of FIG. 5 to FIG. 7 is a diagram showing output images output by the multiview video decoding apparatus 100 according to Embodiment 1.

As shown in each of the diagrams, the upper sequence represents L-channel output images for the left eye (images for L) and the lower sequence represents R-channel output images for the right eye (images for R). More specifically, L-1 to L-6 denote output images decoded in the L-channel coded video stream, and R-1 to R-6 denote output images decoded in the R-channel coded video stream. Here, smaller numbers show images output earlier.

In addition, the image name L-5 underlined denotes an output image generated by decoding an intra coded image, and the other image names denote output images generated by decoding inter coded images. Each of the arrows shows that, in inter coding, the image that is the source of the arrow is referred to in order to decode the image indicated by the arrow. For example, the diagram shows that the image L-1 is referred to in order to decode an image R-1.

As shown in FIG. 5, in the case where an error is detected in an image L-2 decoded in the L-channel side coded video stream, error concealment is performed on the error-source image according to the processes (S106 to S116 of FIG. 4) as shown in FIG. 4.

Here, it is assumed that the error detecting unit 120 detects the error-source image L-2 as a decoding error at the L-channel side (YES in S106 of FIG. 4). In other words, the white bold arrow in the diagram shows that the decoded image replacing unit 130 outputs a decoded previous image L-1 instead of the error-source image L-2 in the diagram. In addition, the diagram also shows that the decoded image replacing unit 130 outputs the decoded previous image R-1 having substantially the same display time as that of the corresponding image at the L-channel side. This shows that the decoded image replacing unit 130 never outputs the error-source image detected by the error detecting unit 120.

In the case where a current coded image in the L-channel side coded video stream is not an intra coded image, the decoded image replacing unit 130 sequentially outputs images L-1 and R-1 (NO in S112, and S114 of FIG. 4). On the other hand, in the case where the following conditions are satisfied: the current coded image in the L-channel side coded video stream is an intra coded image; and no error is detected in any of the L-channel side image and the R-channel side image, the decoded image replacing unit 130 outputs normal images at each of the L channel side and the R channel side (YES in S112, S116 of FIG. 4).

In this case, according to an aspect of the present invention, the image for L corresponds to the "one of the decoded images" and the "first decoded image". Likewise, according to the aspect of the present invention, the image for R corresponds to an/the "other one of the decoded images" and the "second decoded image".

In addition, according to the aspect of the present invention, L-2 and R-2 correspond to the "error-source image" and the "associated error image", respectively. In addition, according to the aspect of the present invention, L-1 and R-1 correspond to the "previous image" and the "associated previous image", respectively.

In addition, according to the aspect of the present invention, L-4 corresponds to the "immediately-before image", and a plurality of images L-2 to L-4 corresponds to the "decoded error images". In addition, according to the aspect of the present invention, a plurality of decoded images from R-2 to R-4 corresponds to the "decoded associated error images".

A plurality of decoded images included in the decoded error images is decoded with reference to L-2, and thus L-3 and L-4 include an error. Here, L-2 that is a starting image in a decoded error image sequence is referred to as an error-source image.

In this way, since images including an error are not displayed, it is possible to reduce the possibility of causing the viewer to have a trouble in recognizing the image content, and to suppress the propagation of the error.

FIG. 6 shows output images in the same manner as FIG. 5. The description of FIG. 6 is the same as that of FIG. 5, and thus no detailed description is repeated here. As shown in FIG. 6, in the case where an error is detected in decoded R-2 resulting from in the R-channel side coded video stream, error concealment is performed on the error-source image according to the processes (S108 to S116 of FIG. 4) as shown in FIG. 4.

Here, it is assumed that the error detecting unit 120 detects an error-source image R-2 as a decoding error at the R-channel side (YES in S108 of FIG. 4). In other words, the white bold arrow in the diagram shows that the decoded image replacing unit 130 outputs the decoded previous image R-1 instead of the decoded image R-2 in FIG. 6. In addition, the diagram also shows that the decoded image replacing unit 130 outputs the decoded previous image L-1 having substantially the same display time as that of the associated image at the R-channel side. This shows that the decoded image replacing unit 130 never outputs the error-source image detected by the error detected unit 120.

In the case where a current coded image in the L-channel side coded video stream is not an intra coded image, the decoded image replacing unit 130 sequentially outputs images L-1 and R-1 (NO in S112, and S114 of FIG. 4). On the other hand, in the case where the following conditions are satisfied: the current coded image in the L-channel side coded video stream is an intra coded image; and no error is detected in any of the L-channel side image and the R-channel side image, the decoded image replacing unit 130 outputs normal images at each of the L channel side and the R channel side (YES in S112, S116 of FIG. 4).

In this case, according to an aspect of the present invention, the image for L corresponds to the "one of the decoded videos" and the "second decoded image". Likewise, according to the aspect of the present invention, the image for R corresponds to an/the "other one of the decoded videos" and the "first decoded image".

In addition, according to the aspect of the present invention, R-2 and L-2 correspond to the "error-source image" and the "associated error image", respectively. In addition, according to the aspect of the present invention, R-1 and L-1 correspond to the "previous image" and the "associated previous image", respectively.

In addition, according to the aspect of the present invention, L-4 corresponds to the "immediately-before image", and a plurality of images R-2 to R-4 corresponds to the "decoded error images". In addition, according to the aspect of the present invention, a plurality of decoded images from L-2 to L-4 corresponds to the "decoded associated error images".

A plurality of decoded images included in the decoded error images is decoded with reference to R-2, and thus R-3 and R-4 include an error. Here, R-2 that is a starting image in a decoded error image sequence is referred to as an error-source image.

In this way, since images including an error are not displayed, it is possible to reduce the possibility of causing the viewer to have a trouble in recognizing the image content, and to suppress the propagation of the error.

The above descriptions are given of a case where no error is detected in the R-channel side image when an error is detected in the L-channel side image, and the opposite case. However, as shown in FIG. 7, actually, an error may be detected in both the L-channel side image and the R-channel side image.

Here is given a case where the error detecting unit 120 detects a decoding error at both the L-channel side image and the R-channel side image. In other words, the white bold arrow in the diagram shows that the decoded image replacing unit 130 outputs decoded previous images L-1 and R-1 instead of L-2 and R-2 in FIG. 7. This shows that the decoded image replacing unit 130 never outputs the error-source image detected by the error detected unit 120.

In the case where a current coded image in the L-channel side coded video stream is not an intra coded image, the decoded image replacing unit 130 sequentially outputs images L-1 and R-1. On the other hand, in the case where the following conditions are satisfied: the current coded image in the L-channel side coded video stream is an intra coded image; and no error is detected in any of the L-channel side image and the R-channel side image, the decoded image replacing unit 130 outputs normal images at each of the L channel side and the R channel side.

This case is the same as the case as shown in FIG. 5 when L-2 is the error-source image, or is the same as the case as shown in FIG. 6 when R-2 is the error-source image.

In other words, according to an aspect of the present invention, when L-2 and R-2 correspond to the "error-source image" and the "associated error image", respectively, L-1 and R-1 correspond to the "previous image" and the "associated previous image", respectively. In addition, according to the aspect of the present invention, L-4 corresponds to the "immediately-before image", and a plurality of images L-2 to L-4 corresponds to the "decoded error images". In addition, according to the aspect of the present invention, a plurality of decoded images from R-2 to R-4 corresponds to the "decoded associated error images". In this case, according to the aspect of the present invention, the image for L corresponds to the "one of the decoded videos" and the "first decoded image". Likewise, according to the aspect of the present invention, the image for R corresponds to an/the "other one of the decoded videos" and the "second decoded image".

In other words, according to the aspect of the present invention, when R-2 and L-2 correspond to the "error-source image" and the "associated error image", respectively, R-1 and L-1 correspond to the "previous image" and the "associated previous image", respectively. In addition, according to the aspect of the present invention, L-4 corresponds to the "immediately-before image", and a plurality of images R-2 to R-4 corresponds to the "decoded error images". In addition, according to the aspect of the present invention, a plurality of decoded images from L-2 to L-4 corresponds to the "decoded associated error images". In this case, according to the aspect of the present invention, the image for L corresponds to the "one of the decoded videos" and the "second decoded image". Likewise, according to the aspect of the present invention, the image for R corresponds to an/the "other one of the decoded videos" and the "first decoded image".

In this way, by outputting images in the same manner as in any one of the cases as shown in FIGS. 5 and 6, it is possible to prevent an error from spreading and prevent images including the error from being displayed. This makes it possible to reduce the possibility of causing the viewer to have a trouble in recognizing the image content, and to suppress the propagation of the error.

(Embodiment 2)

In Embodiment 1, it is assumed that the number of channels at the dependent view sides of the input coded video streams is one. However, in Embodiment 2, it is assumed that the number of channels at the dependent view sides of the input coded video streams is two.

Figure 8:
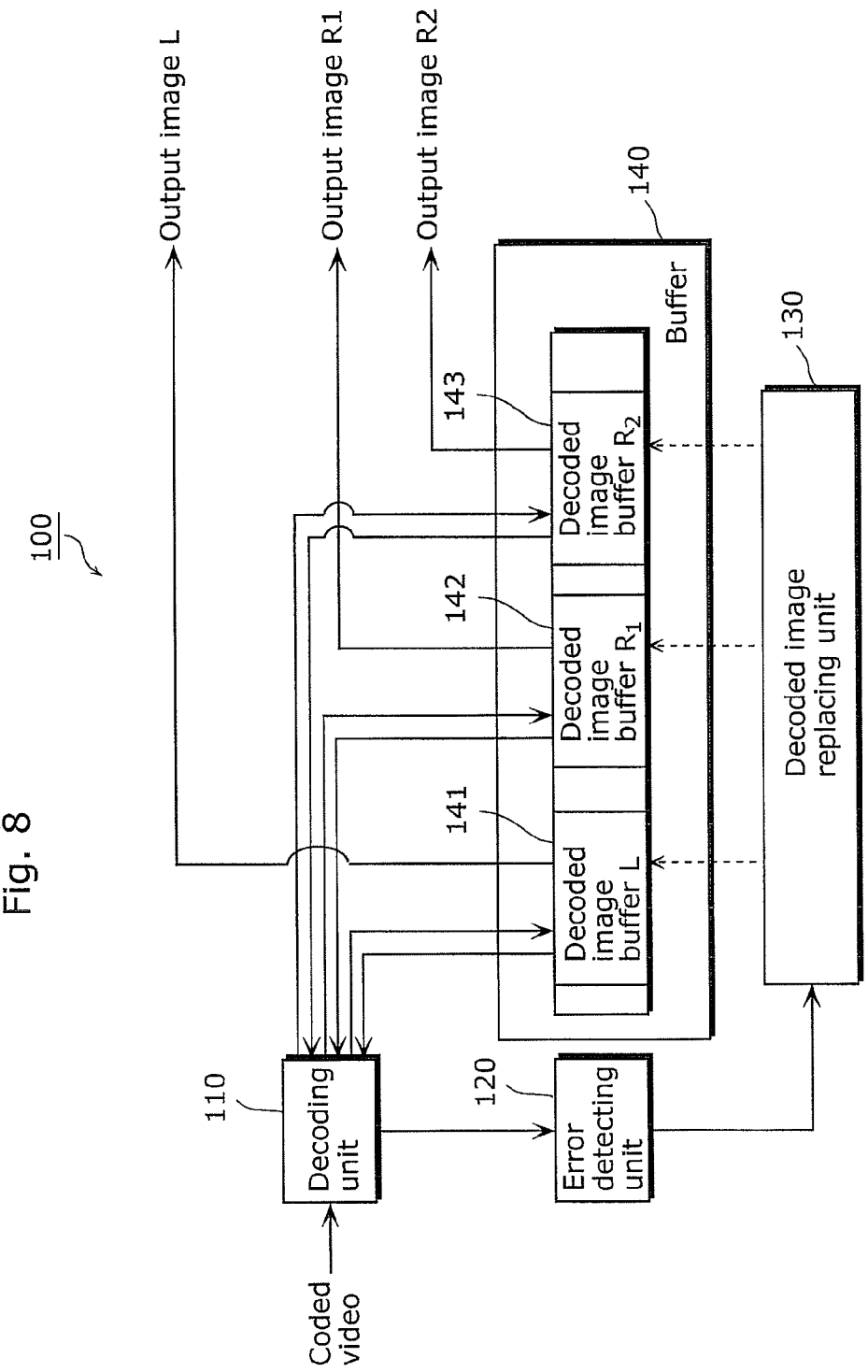
FIG. 8 is a block diagram of a structure of a multiview video decoding apparatus according to Embodiment 2 of the present invention.

FIG. 8 is a block diagram of a structure of a multiview video decoding apparatus 100 according to Embodiment 2 of the present invention.

As shown in the diagram, the multiview image decoding apparatus 100 according to Embodiment 2 includes a decoding unit 110, an error detecting unit 120, a decoded image replacing unit 130, and a buffer 140, similarly to the multiview image decoding apparatus 100 according to Embodiment 1. Here, three-channel coded video streams that are three coded videos are input to the multiview video decoding apparatus 100.

The buffer 140 is a memory in which decoded images are stored, and includes a decoded image buffer L141, a decoded image buffer $R_1$142, and a decoded image buffer $R_2$143. The decoded image buffer L141 stores images for L that are decoded images for base vide side channel. In addition, the decoded image buffer $R_1$142 and the decoded image buffer $R_2$143 store images for R1 and images for R2, respectively, which are decoded images at the respective two dependent view side channels.

The decoding unit 110 decodes one of the three coded videos without reference to any decoded image included in the other two coded videos to generate one of decoded videos, and decodes the other two coded videos with reference to decoded images included in the one of the coded videos to generate the other two of the decoded videos.

Figure 9:
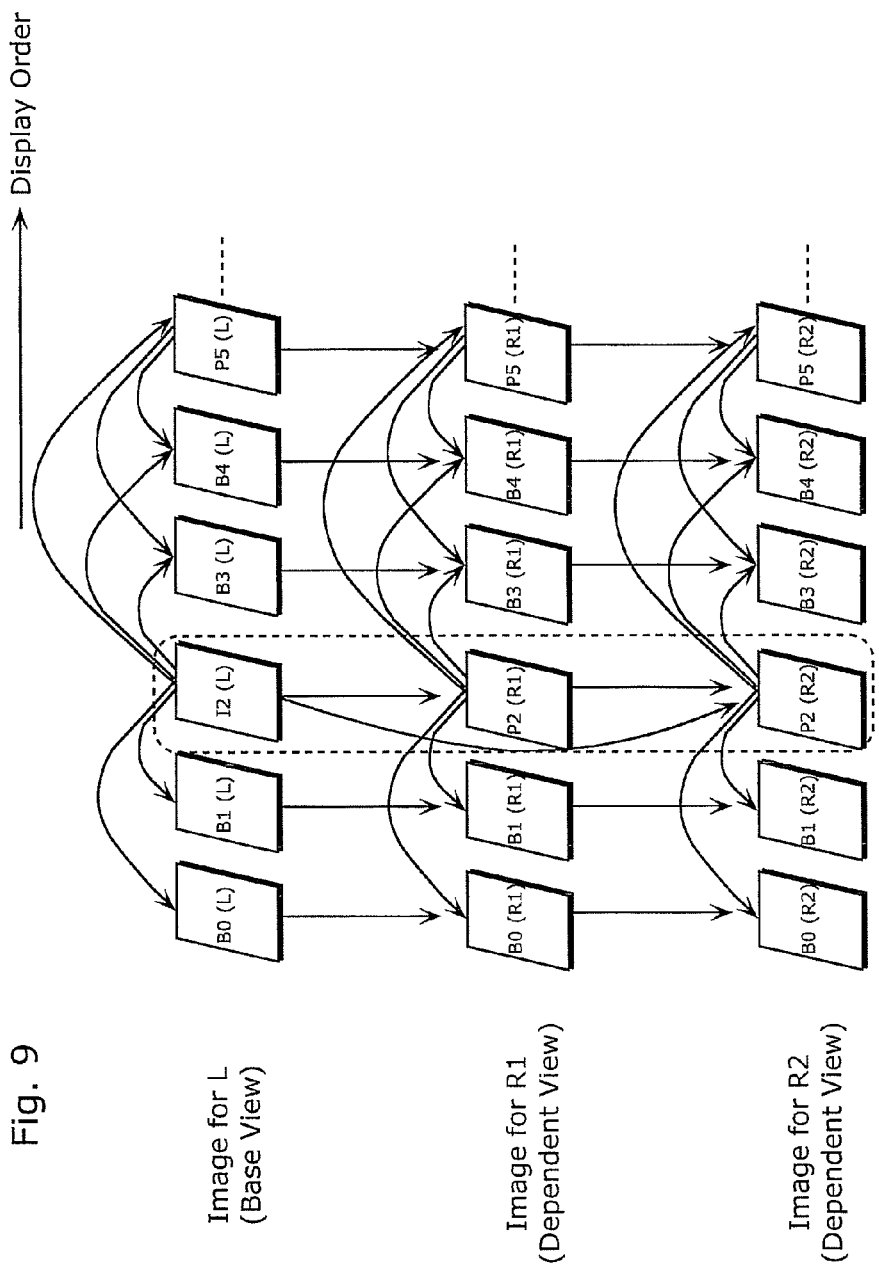
FIG. 9 is a diagram illustrating how a decoding unit according to Embodiment 2 of the present invention decodes three coded videos.
Figure 14A:
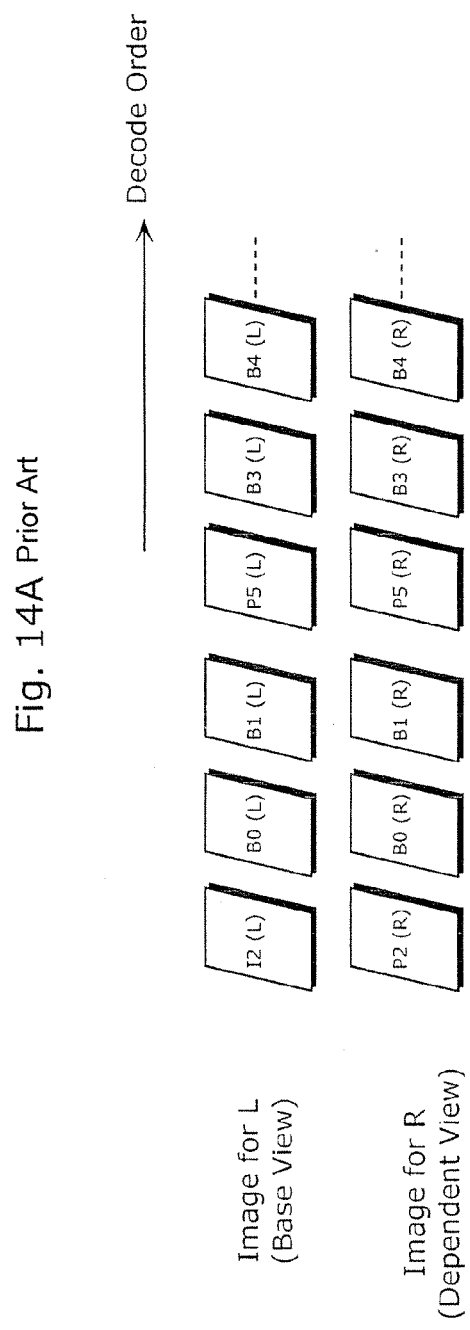
FIG. 14A is a diagram illustrating Multiview Video Coding (MVC) according to the conventional art.

FIG. 9 is a diagram illustrating how a decoding unit 110 according to Embodiment 2 decodes the three coded videos. The method of drawing arrows in the diagram are the same as the method illustrated in FIG. 14, and thus no detailed description is repeated.

As shown in the diagram, the decoding unit 110 decodes the coded video stream for L at the base view side channel without reference to any image for R1 and any image for R2 that are decoded images generated by decoding the coded video stream for R1 and the coded video stream for R2 at the respective two dependent view side channels to generate images for L that are a plurality of decoded images.

In addition, the decoding unit 110 decodes the coded video stream for R1 and the coded video stream for R2 to generate images for R1 and images for R2. Here, the decoding unit 110 generates the images for R1 with reference to decoded images included in the images for L. In addition, the decoding unit 110 generates the images for R2 with reference to decoded images included in either the images for L or the images for R1.

It is to be noted that, in the decoding of a decoding target image that is an image for R1 or R2, a decoded image for L, R1, or R2 having substantially the same display time as the decoding target image is referred to as a reference image.

Returning to FIG. 8, the error detecting unit 120 detects an error-source image from among the decoded images each of which is included in either the images for L, the images for R1, or the images for R2.

The decoded image replacing unit 130 replaces the error-source image detected by the error detecting unit 120 with a first decoded image generated using a previous image, and replaces the associated error image with a second decoded image generated using an associated previous image.

In addition, the decoded image replacing unit 130 replaces, using the previous image, decoded error images that are displayed inclusively between the error-source image and either the image immediately before the image generated by decoding an intra coded image or the decoded image displayed in association with the immediately-before image, and replaces decoded associated error images using the associated previous image.

More specifically, for example, in the case where the error detecting unit 120 detects an error-source image among the images for L, the decoded image replacing unit 130 outputs an instruction for causing the image for L previously decoded and stored in the decoded image buffer L141 to be output as an output image L for the L channel. In addition, the decoded image replacing unit 130 issues an instruction for causing images for R1 and images for R2 previously decoded and respectively stored in the decoded image buffer $R_1$142 and the decoded image buffer $R_2$143 to be output as output images R1 for R1 channel and output images for R2 for R2 channel.

Here, the decoded previous images for L and the respectively associated decoded previous images for R1 and R2 are images having substantially the same display times in display order recorded in the streams.

In this case, according to the aspect of the present invention, each output image L corresponds to the "first decoded image", and each output image R1 and each output image R2 correspond to the "second decoded image". In addition, according to the aspect of the present invention, each decoded previous image L corresponds to the "previous image", and each decoded previous image R1 and each decoded previous image R2 correspond to the "associated previous images".

Next, a description is given of the decoding procedure taken by the multiview video decoding apparatus 100 according to Embodiment 2.

Figure 10:
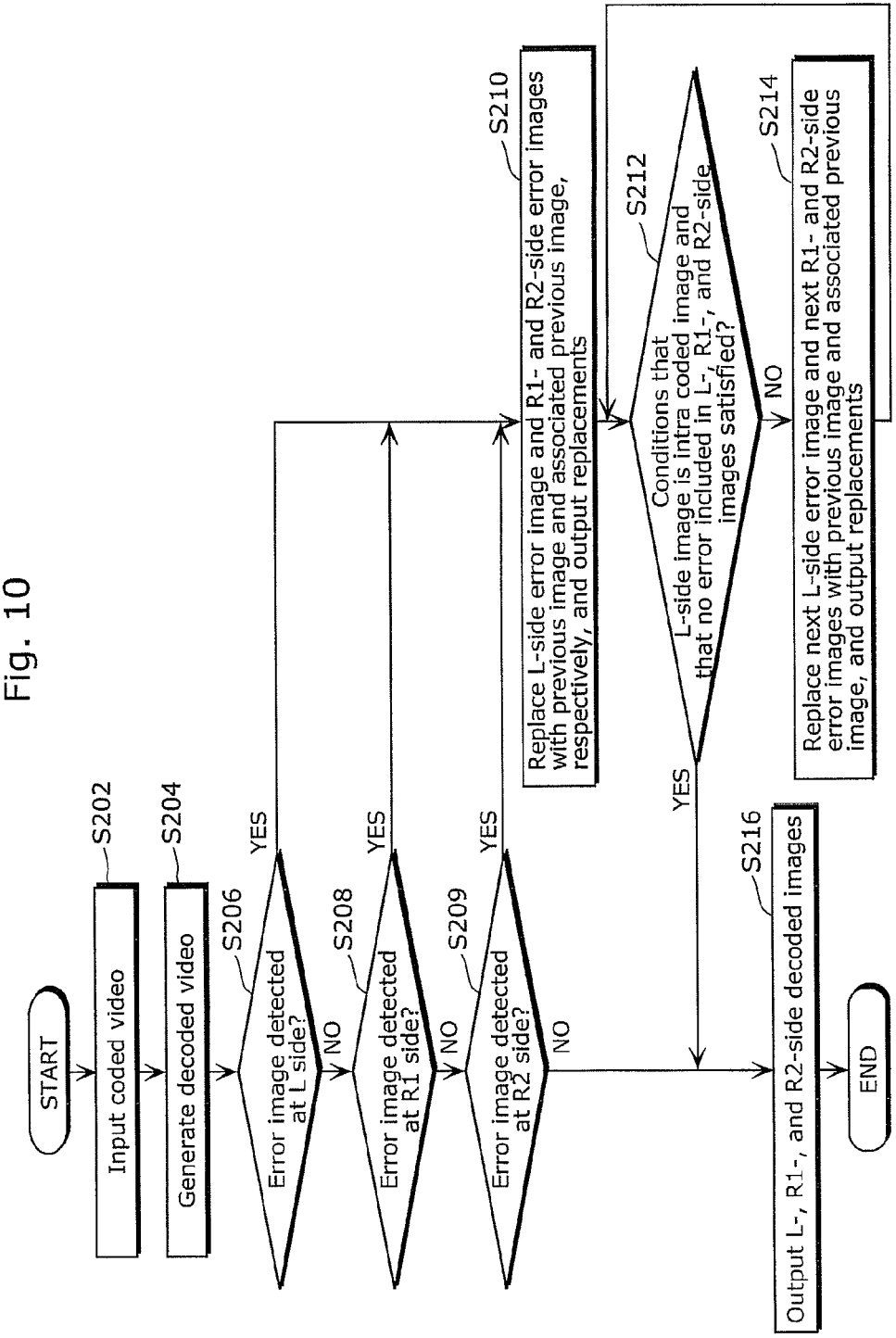
FIG. 10 is a flowchart of decoding processes performed by the multiview video decoding apparatus according to Embodiment 2 of the present invention.

FIG. 10 is a flowchart of decoding processes performed by the multiview video decoding apparatus 100 according to Embodiment 2.

First, a plurality of three-channel coded video streams that is a plurality of coded videos is input to the decoding unit 110 (S202).

The decoding unit 110 decodes the coded videos to generate a plurality of decoded videos (S204).

The error detecting unit 120 determines whether or not an error-source image is detected in the decoded images included in the L-channel side decoded video (S206).

The error detecting unit 120 determines whether or not an error-source image is detected in the decoded images included in the R-channel side decoded video (S208) in the case where no error-source image is detected in the L-channel side decoded video (No in S206).

The error detecting unit 120 determines whether or not an error-source image is detected in the decoded images included in the R-channel side decoded video (S209) in the case where no error-source image is detected in the R1-channel side decoded video (No in S208).

In the case where the error detecting unit 120 detects an error-source image in the L-channel side decoded video (YES in S206), or detects an error-source image in the R1-channel side decoded video (YES in S208), or detects an error-source image in the R2-channel side decoded video (YES in S209), the decoded image replacing unit 130 replaces the error-source image and the associated error image with the previous image and the associated previous image at each of the L-channel side and the R-channel sides, and outputs the replacements (S210).

More specifically, the decoded image replacing unit 130 outputs an instruction for causing the previous decoded images having substantially the same display times at the L-channel side, the R1-channel side, and the R2-channel side to be output respectively from the decoded image buffer L141, the decoded image buffer $R_1$142, and the decoded image buffer $R_2$143 as an output image L, an output image R1, and an output image R2.

It is to be noted that the same process (S210) is performed also in the case where errors are detected in two or more channels at the L-channel side, the R1-channel side, and the R2-channel side.

Subsequently, the decoding unit 110 determines whether or not a current image in the L-channel side coded video stream is an intra coded image, and determines whether or not the error detecting unit 120 does not detect any error in the images at the L-, R1- and R2-channel side coded video streams and thus whether or not accurate decoding is possible (S212).

In the case where the decoding unit 110 determines that a current image in the L-channel side coded video stream is an intra coded image, and each of the L-, R1- and R2-channel sides does not include any error (YES in S212), the decoding unit 110 completes the decoding of the desired image at each of the L-, R1- and R2-channel sides. After the completion, the decoded image replacing unit 130 causes the decoded images to be output from the decoded image buffer L141, the decoded image buffer $R_1$142, and the decoded image buffer $R_2$143 (S216).

In the case where the decoding unit 110 determines that a current image in the L-channel side coded video stream is not an intra coded image, and one of the L-, R1- and R2-channel side images includes an error (NO in S212), the decoding unit 110 replaces the current L-channel side image, and the current R1- and R2-channel side images with the previous image and the associated previous image, respectively, and outputs the replacements (S214).

The decoding unit 110 repeats the process (S214) of replacing the current L-channel side image and the current R1- and R2 channel side images with the previous image and the associated previous image and outputting the replacements until when the following conditions are satisfied: a next current image in the L-channel side coded video stream is an intra coded image; and each of the L-channel side image and the R1- and R2-channel side images does not include any error. There is a case where the processing is completed when the inputs of the coded video streams are completed, but this case is not shown in the drawings.

In the case where the error detecting unit 120 does not detect an error-source image in the R-channel side decoded video (NO in S209), the decoding unit 110 completes the decoding of the desired image at each of the L- and R-channel sides. After the completion, the decoded image replacing unit 130 causes the decoded images to be output from the decoded image buffer L141, the decoded image buffer $R_1$142, and the decoded image buffer $R_2$143 (S216).

Here, the intra coded image may be an IDR picture.

This is the completion of a set of decoding processes performed by the multiview video decoding apparatus 100 according to Embodiment 2.

The following describes operations performed by the multiview video decoding apparatus 100 according to Embodiment 2.

Figure 11:
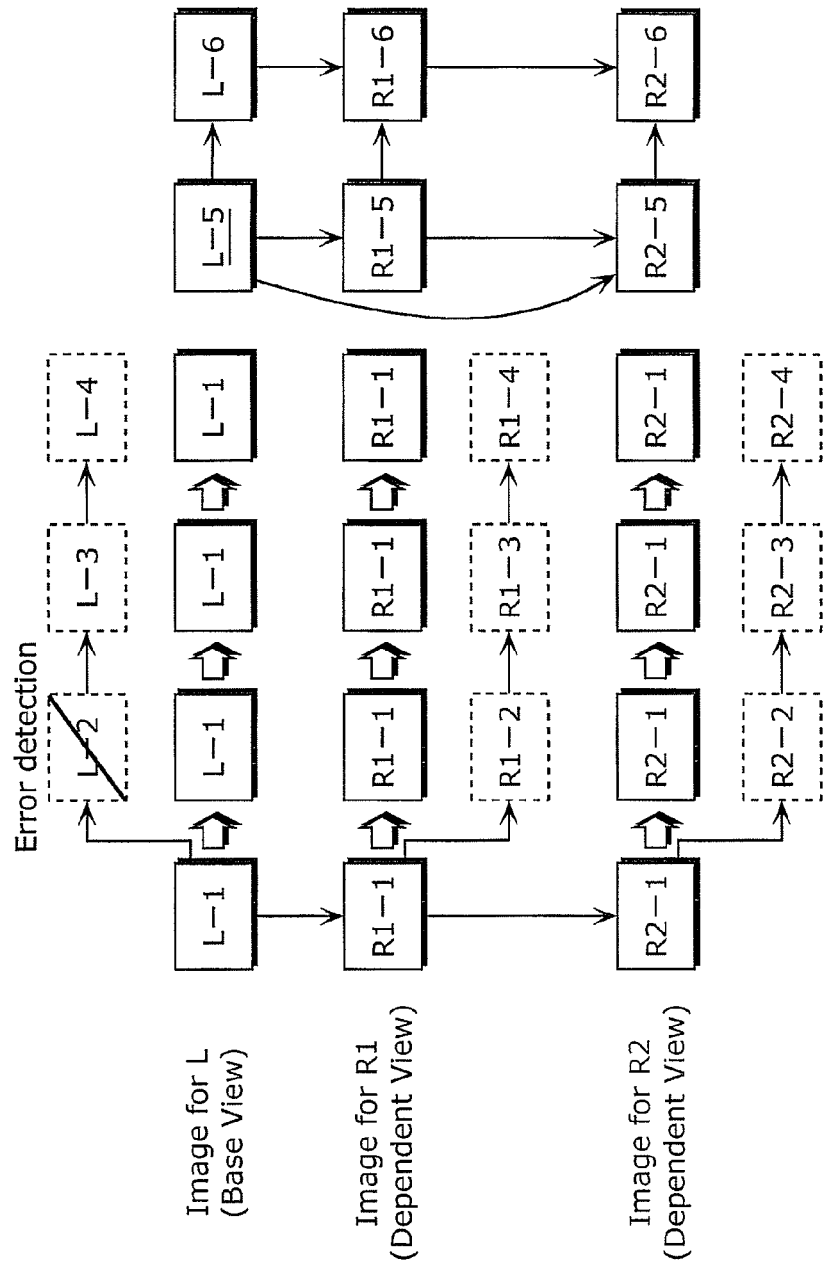
FIG. 11 is a diagram showing output images output by the multiview video decoding apparatus according to Embodiment 2 of the present invention.
Figure 12:
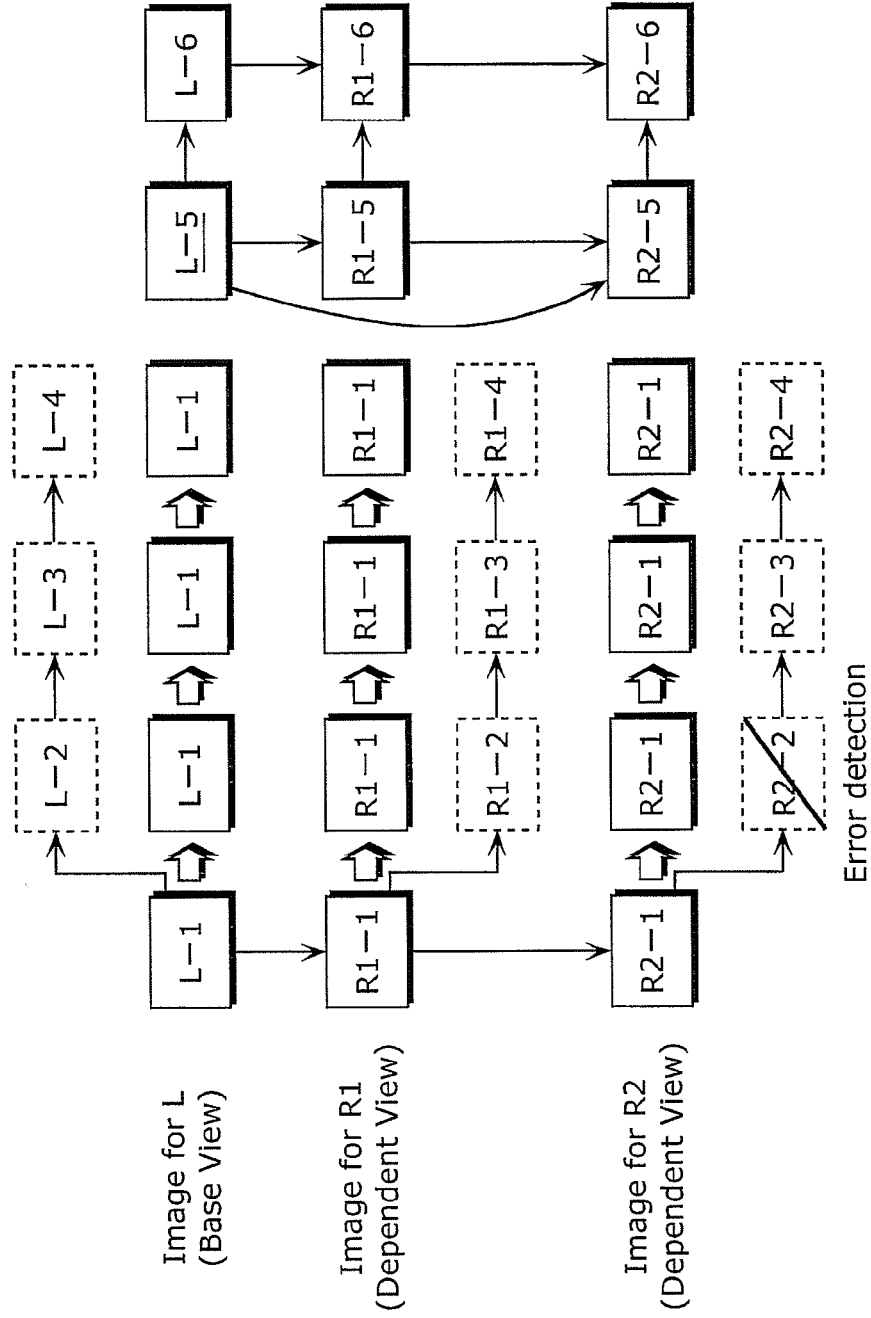
FIG. 12 is a diagram showing output images output by the multiview video decoding apparatus according to Embodiment 2 of the present invention.

Each of FIG. 11 to FIG. 12 is a diagram showing output images output by the multiview video decoding apparatus 100 according to Embodiment 2.

As shown in each of the diagrams, the upper sequence represents output images for the L channel (images for L), the middle sequence represents output images for the R1 channel (images for R1), and the lower sequence represents output images for the R2 channel (images for R2). Detailed descriptions are the same as the descriptions given with reference to FIG. 5 to FIG. 7, and thus the same descriptions are not repeated here.

As shown in FIG. 11, in the case where an error is detected in L-2 decoded in the L-channel side coded video stream, error concealment is performed on the error-source image according to the processes (S206 to S216 of FIG. 10) as shown in FIG. 10.

Here, it is assumed that the error detecting unit 120 detects an error-source image L-2 as a decoding error at the L-channel side (YES in S206 of FIG. 10). In other words, the white bold arrow in the diagram shows that the decoded image replacing unit 130 outputs decoded previous image L-1 instead of L-2 in the diagram. In addition, the diagram also shows that the decoded image replacing unit 130 outputs, instead of R1-2 and R2-2, decoded previous images R-1 and R2-1 having substantially the same display times as that of the corresponding image at the L-channel side. This shows that the decoded image replacing unit 130 never outputs the error-source image detected by the error detected unit 120.

In the case where a current coded image in the L-channel side coded video stream is not an intra coded image, the decoded image replacing unit 130 sequentially outputs images L-1, R1-1, and R2-1 (NO in S212, and S214 of FIG. 10). On the other hand, in the case where the following conditions are satisfied: a current coded image in the L-channel side coded video stream is an intra coded image; and no error is detected in any of the L-channel side image and the R-channel side image, the decoded image replacing unit 130 outputs normal images at all the L channel, the R1 channel, and the R2 channel (YES in S212, S216 of FIG. 4).

In this case, according to the aspect of the present invention, the image for L corresponds to the "one of the decoded videos" and the "first decoded image". Likewise, according to the aspect of the present invention, the images for R1 and R2 correspond to the "other ones of the decoded videos" and the "second decoded images".

In addition, according to the aspect of the present invention, L-2 corresponds to the "error-source image", and R1-2 and R2-2 correspond to the "associated error images". In addition, according to the aspect of the present invention, L-1 corresponds to the "previous image" according to an aspect of the present invention, and R1-1 and R2-1 correspond to the "associated error images".

In addition, according to the aspect of the present invention, L-4 corresponds to the "immediately-before image", and a plurality of images L-2 to L-4 corresponds to the "decoded error images". In addition, according to the aspect of the present invention, a plurality of decoded images from R1-2 to R1-4 and a plurality of decoded images from R2-2 to R2-4 correspond to the "decoded associated error images".

In this way, since images including an error are not displayed, it is possible to reduce the possibility of causing the viewer to have a trouble in recognizing the image content, and to suppress the propagation of the error.

As shown in FIG. 12, in the case where an error is detected in R2-2 decoded in the R2-channel side coded video stream, error concealment is performed on the error images according to the processes (S209 to S216 of FIG. 10) as shown in FIG. 10.

Here, it is assumed that the error detecting unit 120 detects an error-source image R2-2 as a decoding error at the R2-channel side (YES in S209 of FIG. 10). In other words, the white bold arrow in the diagram shows that the decoded image replacing unit 130 outputs decoded previous image R2-1 instead of R2-2 in the same diagram. In addition, the diagram also shows that the decoded image replacing unit 130 outputs, instead of L-2 and R1-2, decoded previous images L-1 and R1-1 having substantially the same display times as that of the corresponding image at the R2-channel side. This shows that the decoded image replacing unit 130 never outputs the error-source image detected by the error detected unit 120.

In the case where a current coded image in the L-channel side coded video stream is not an intra coded image, the decoded image replacing unit 130 outputs images L-1, R1-1, and R2-1 (NO in S212, and S214 of FIG. 10). On the other hand, in the case where the following conditions are satisfied: a current coded image in the L-channel side coded video stream is an intra coded image; and no error is detected in any of the L-channel side image and the R-channel side image, the decoded image replacing unit 130 outputs normal images at all the L channel, the R1 channel, and the R2 channel (YES in S212, S216 of FIG. 4).

In this case, according to the aspect of the present invention, the image for L corresponds to the "one of the decoded videos" and the "second decoded image". Likewise, according to the aspect of the present invention, the image for R1 corresponds to an/the "other one of the decoded videos" and the "second decoded image". Likewise, according to the aspect of the present invention, the image for R2 corresponds to an/the "other one of the decoded videos" and the "first decoded image".

In addition, according to the aspect of the present invention, R2-2 corresponds to the "error-source image", and L-2 and R1-2 correspond to the "associated error images". In addition, according to the aspect of the present invention, R2-1 corresponds to the "previous image", and L-1 and R1-1 correspond to the "associated error images".

In addition, according to the aspect of the present invention, L-4 corresponds to the "immediately-before image", and a plurality of decoded images R2-2 to R2-4 corresponds to the "decoded error images". In addition, according to the aspect of the present invention, a plurality of decoded images from L-2 to L-4 and a plurality of decoded images from R1-2 to R1-4 correspond to the "decoded associated error images".

In addition, in the case where an error is detected in R1-2 generated by decoding the coded video stream at the R1 channel side, it is possible to conceal the error by performing the same processes.

In this way, since images including an error are not displayed, it is possible to reduce the possibility of causing the viewer to have a trouble in recognizing the image content, and to suppress the propagation of the error.

(Embodiment 3)

Embodiment 3 descries a multiview video decoding apparatus 200 including the multiview video decoding apparatus 100 according to any one of Embodiments 1 and 2.

Figure 13:
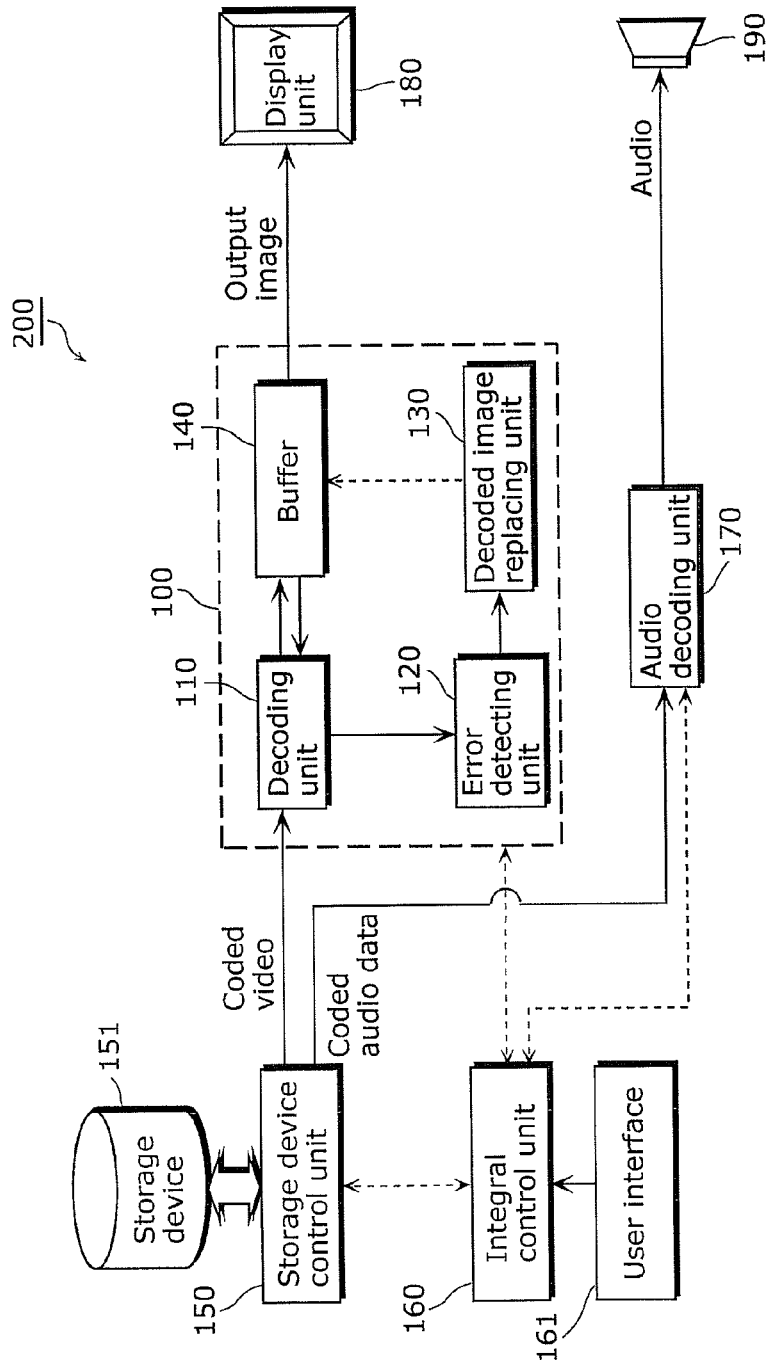
FIG. 13 is a block diagram of a structure of a multiview video decoding apparatus according to Embodiment 3 of the present invention.

FIG. 13 is a block diagram of a structure of the multiview video decoding apparatus 200 according to Embodiment 3 of the present invention. The diagram is based on FIG. 3 showing Embodiment 1 and shows the structure that is applicable to a DVD recorder (digital video recorder) and a Blu-ray disc recorder (or BD recorder), etc.

The multiview video decoding apparatus 200 includes a storage device 151, a storage device control unit 150, an integral control unit 160, a user interface 161, an audio decoding unit 170, a display unit 180, and a speaker 190, in addition to the multiview video decoding apparatus 100 as shown in FIG. 3.

The storage device control unit 150 reads out multiview coded video streams that are coded videos stored in the storage device 151 and sends coded video data to the decoding unit 110, according to an instruction from the integral control unit 160.

The decoding unit 110 decodes the multiview coded video streams, and stores them in the buffer 140. The error detecting unit 120 detects whether or not any of the multiview coded video streams includes an error in the same manner as in FIG. 3, and sends the error information to the decoded image replacing unit 130. Upon receiving the error information, the decoded image replacing unit 130 selects output images from the buffer 140, and outputs the selected output images to the display unit 180.

It is to be noted here that 3D display is possible when the multiview coded video streams are L- and R-channel coded video streams. In addition, it is possible to perform the same processes as in Embodiment 1 even in the case where an error is detected by the error detecting unit 120.

In addition, the storage device control unit 150 reads out coded audio data stored in the storage device 151 and sends the coded audio data to the audio decoding unit 170, according to an instruction from the integral control unit 160. The coded audio data is decoded by the audio decoding unit 170, and then is output to the speaker 190.

The integral control unit 160 is capable of controlling the multiview video decoding apparatus 100 and the audio decoding unit 170 though the user interface 161.

In this way, each of the multiview video decoding apparatuses 100 and 200 according to Embodiments 1 to 3 detects an error-source image from among the decoded images included in the decoded videos, and replaces the error-source image and the associated error image with an error-free image generated using a past image and an error-free image generated using an associated past image, respectively. For this reason, it is possible to output the error-free images even when one of the input coded videos include an error.

Here, a replacement of only the error-source image with an error-free image in order to remove the error from the error-source image breaks the balance between the decoded videos. For example, in the case of displaying a 3D image, a breakage of the balance between a right-eye image and a left-eye image causes a trouble in the recognition of the content of the resulting image by significantly affecting human visual recognition. For this reason, in order to prevent the breakage of the balance between the decoded videos, both of the error-source image and the associated error image are replaced with images respectively generated using the past image and the associated past image.

In addition, the decoded image replacing unit 130 replaces the error-source image with the previous image, and replaces the associated error image with the associated previous image. Since the previous image and the associated previous image are output and displayed instead of the error-source image and the associated error image, it is possible to reduce the possibility of causing a trouble in the recognition of the content of the images, and to reduce the influence of the error on the human visual recognition as much as possible.

In addition, the decoded image replacing unit 130 replaces, using the previous image, the decoded error images that are displayed inclusively between the error-source image and the decoded image immediately before the decoded image generated by decoding an intra coded image, and replaces the decoded associated error image using the associated previous image. In other words, after the occurrence of the error, the error concealment is performed until the intra coded image appears in the coded video stream at the base view side. Here, the intra coded image is an image that is decoded without reference to any other image, and thus rarely includes an error. Therefore, it is unlikely that the images following the intra coded image includes an error.

In addition, the decoded image replacing unit may replace the decoded error images and the decoded associated error images assuming that the IDR picture is the intra coded image. In other words, after the occurrence of the error, the error concealment is continued until the IDR picture appears in the coded video stream at the base view side. Here, the IDR picture is a picture which is the starting picture of an image sequence, and at which all pieces of information necessary for decoding are reset. For this reason, the IDR picture is most unlikely to include an error among intra coded images. Therefore, it is unlikely that the images following the intra coded image includes an error.

In addition, the decoded error images and the decoded associated error images are replaced until the appearance of the error-free decoded image generated by decoding the intra coded image and the appearance of the error-free decoded image that is displayed in association with the decoded image. The error concealment continued while errors are found makes it possible to reduce the possibility of causing a trouble in the recognition of the content of the images, and to reduce the influence of the error on the human visual recognition as much as possible.

In addition, the decoded image replacing unit 130 replaces the decoded images included in the decoded error images with the image generated using the previous image, and replaces the decoded images included in the decoded associated error images with the image generated using the associated previous image. In other words, concealing the error included in any one of the decoded images of each set of mutually associated decoded images by replacing the set of mutually associated decoded images with the same image makes it possible to prevent a totally different image from being suddenly displayed in an unnatural manner.

In addition, the error-source image and the associated error image are displayed at substantially the same time, and are replaced using the previous image and the associated previous image that are displayed at substantially the same time. For this reason, for example, in a 3D image in which right-eye images and corresponding left-eye images are displayed at substantially the same time, it is possible to reduce the possibility of causing a trouble in the recognition of the content of the images and reducing the influence of the error on the human visual recognition as much as possible.

In this way, it is possible to reduce the possibility of causing the trouble in the recognition of the content of the images of coded video streams which are multiview coded to have a reference relationship between the multi-channels and to reduce, as much as possible, the influence of the error on the human visual recognition even when the error occurs in the decoding of the coded video streams.

The multiview video decoding apparatuses according to the exemplary embodiments of the present invention are described up to this point. However, the present invention is not limited to the embodiments. Those skilled in the art will readily appreciate that many modifications are possible in the exemplary embodiments and other embodiments are possible by arbitrarily combining the structural elements of the embodiments without materially departing from the novel teachings and advantageous effects of the present invention. Accordingly, all of the modifications and other embodiments are intended to be included within the scope of the present invention.

For example, in the exemplary embodiments, the number of channels at the dependent view side of the input coded video streams is one or two. However, the number of channels at the dependent view side of the coded video streams is not limited to one or two and may be three or greater.

In the exemplary embodiments, like the image for L (left eye) and the image for R (right eye), the decoded images that are displayed in association with each other are output and displayed at substantially the same time. However, the decoded images displayed in association with each other do not always need to be displayed at substantially the same time, and may be alternately displayed. For example, a user can view a 3D video even when images for L and images for R are alternately displayed.

In each of the above embodiments, the multiview video decoding apparatus 100 includes a single decoding unit 110. However, the multiview video decoding apparatus 100 may includes a plurality of decoding units 110.

In the exemplary embodiments, a previous image is displayed immediately before an error-source image and does not include any error. However, the previous image is not limited to an image that is displayed immediately before an error-source image, and may be, for example, an image that is displayed before the error-source image by two images.

In each of the above embodiments, the decoded image replacing unit 130 replaces an error-source image with a previous image, and replaces an associated error image with an associated previous image. However, the decoded image replacing unit 130 may replace the error-source image with not the previous image but an image generated by modifying the previous image, and may replace the associated error image with not the associated previous image but an image generated by modifying the associated previous image.

In each of the embodiments, the decoded image replacing unit 130 replaces the decoded images up to the decoded image immediately before the decoded image generated by decoding an intra coded image. However, the decoded image replacing unit 130 may replace not the decoded images up to the immediately-before decoded image but a predetermined number of the decoded images for example.

In each of the exemplary embodiments, the decoded image replacing unit 130 replaces decoded images until an error-free decoded image appears. However, the decoded image replacing unit 130 may replace either the decoded images up to the immediately-before image or the predetermined number of the decoded images, without determining whether or not a current decoded image includes an error.

In each of the exemplary embodiments, the decoded image replacing unit 130 replaces a plurality of decoded images included in the decoded error images with a previous image, and replaces a plurality of decoded images included in the decoded associated error images with an associated previous image. However, the decoded image replacing unit 130 may replace the decoded images included in the decoded error images with not the previous image but an image generated by modifying the previous image, and may replace the decoded images included in the decoded associated error images with not the associated previous image but an image generated by modifying the associated previous image. Here, all of the decoded images included in the decoded error images may not necessarily be replaced with an image, and all of the decoded images included in the decoded associated error images may not necessarily be replaced with an image.

Embodiment 3 describes an example of applying the multiview video decoding apparatus 100 according to the present invention to a DVD recorder or a Blu-ray disc recorder. In addition to the DVD recorder and Blu-ray disc recorder, the multiview video decoding apparatus 100 according to the present invention is also applicable to a three-dimensional image display apparatus (such as a digital television, a mobile telephone, a personal computer, etc.) which displays three-dimensional images.

The multiview video decoding apparatus 100 according to any one of Embodiments 1 and 2 is typically implemented as an LSI that is an integrated circuit. The structural elements of the multiview video decoding apparatus 100 may be individually formed on separate chips, or all or some of the structural elements may be integrated into a single chip.

As a specific example, in the multiview video decoding apparatus 100 as shown in any one of FIG. 3 and FIG. 8, the decoding unit 110 and the error detecting unit 120 may be individually formed on separate chips, or all or one of the units may be integrated into a single chip.

Such integration is not limited to LSI, and may be achieved in the form of an exclusive circuit or a general processor. Field Programmable Gate Array (FPGA) that can be programmed after manufacturing LSI or a reconfigurable processor that allows re-configuration of the connection or configuration of LSI can be used for the same purpose.

Furthermore, when a circuit integration technology for replacing LSIs with new circuits appears in the future with advancement in semiconductor technology and derivative other technologies, the circuit integration technology may be naturally used to integrate the processing units.

Alternatively, all or some of the functions of the multiview video decoding apparatus 100 according to any one of Embodiments 1 and 2 may be achieved by causing a processor such as a CPU to execute a program for achieving the functions.

Furthermore, the present invention may be implemented as the program, or a recording medium having the program recorded thereon. The program can be naturally distributed through transmission media such as the Internet.

Although only some exemplary embodiments of the present invention are described in detail above, those skilled in the art will readily appreciate that many modifications are possible in the exemplary embodiments without materially departing from the novel teachings and advantageous effects of the present invention.

Accordingly, all such modifications are intended to be included within the scope of the present invention.

Industrial Applicability

A multiview video decoding apparatus according to the present invention is applicable to a multiview video decoding apparatus which decodes a plurality of coded video streams that is multiview coded to have a reference relationship and to a method of reproducing the coded video streams. Furthermore, the multiview video decoding apparatus is applicable for use in a DVD recorder, a DVD player, a Blu-ray disc recorder, a Blu-ray disc player, a TV set, etc. each of which is capable of outputting a data for 3D display.

What is claimed is:

1. A multiview video decoding apparatus which decodes a plurality of coded videos generated by coding videos from a plurality of viewpoints, said multiview video decoding apparatus comprising:
   a decoding unit configured to decode one of the coded videos without reference to a decoded image included in an other one of the coded videos to generate one of decoded videos which is composed of a plurality of decoded images, and decode the other one of the coded videos with reference to a decoded image included in the one of the decoded videos to generate an other one of the decoded videos;
   an error detecting unit configured to detect an error-source image which is a decoded image including an error, from among the decoded images included in either the one of the decoded videos or the other one of the decoded videos; and
   a decoded image replacing unit configured to:
   replace the detected error-source image with a first decoded image which does not include an error, the detected error-source image being included in a first decoded video which is either the one of the decoded videos or the other one of the decoded videos; and
   replace an associated error image with a second decoded image, the associated error image being (i) included in a second decoded video which is other than the first decoded video including the error-source image and (ii) displayed in association with the error-source image,
   wherein said decoded image replacing unit is configured to:
   replace, without using the second decoded video, the error-source image with the first decoded image which is generated using a previous image which is a decoded image included in the first decoded video decoded before the decoding of the error-source image; and
   replace, without using the first decoded video, the associated error image with the second decoded image which is generated using an associated previous image which is a decoded image included in the second decoded video and displayed in association with the previous image included in the first decoded video.

2. The multiview video decoding apparatus according to claim 1,
   wherein said decoded image replacing unit is configured to:
   replace the error-source image with the first decoded image generated using the previous image which is displayed immediately before the error-source image and does not include an error; and
   replace the associated error image with the second decoded image generated using the associated previous image displayed in association with the previous image.

3. The multiview video decoding apparatus according to claim 1,
   wherein said decoded image replacing unit is configured to:
   replace the error image with the first decoded image which is the previous image; and
   replace the associated error image with the second decoded image which is the associated previous image.

4. The multiview video decoding apparatus according to claim 1,
   wherein said decoded image replacing unit is configured to:
   replace, using the previous image, decoded error images which are decoded images included in the first decoded video and displayed inclusively between the error-source image and either an immediately-before decoded image or the decoded image which is displayed in association with the immediately-before decoded image, the immediately-before decoded image being a decoded image immediately before the decoded image generated by decoding an intra coded image included in the one of the coded videos before being decoded into the one of the decoded videos; and
   replace, using the associated previous image, decoded associated error images which are decoded images included in the second decoded video and displayed in association with the respective decoded error images.

5. The multiview video decoding apparatus according to claim 4,
   wherein said decoded image replacing unit is configured to:
   replace the decoded error images using the previous image when the intra coded image is an Instantaneous Decoding Refresh (IDR) picture that is a starting picture of an image sequence; and
   replace the decoded associated error images using the associated previous image.

6. The multiview video decoding apparatus according to claim 4,
   wherein said decoded image replacing unit is configured to:
   replace the decoded error images using the previous image, when the immediately-before decoded image is a decoded image immediately before a decoded image generated by decoding the intra coded image which is generated in the case where no error is included in any of the decoded image generated by decoding the intra coded image and the decoded image which is displayed in association with the decoded image resulting from the intra coded image; and
   replace the decoded associated error images using the associated previous image.

7. The multiview video decoding apparatus according to claim 4,
   wherein said decoding image replacing unit is configured to:

replace a plurality of decoded images included in the decoded error images with the first decoded image generated using the previous image, when replacing the decoded error images; and replace a plurality of decoded images included in the decoded associated error images with the second decoded image generated using the associated previous image, when replacing the decoded associated error images.

8. The multiview video decoding apparatus according to claim 1, wherein said decoded image replacing unit is configured to:

replace the error image with the first decoded image generated using the previous image; and replace the associated error image displayed at a substantially same display time as a display time of the error image with the second decoded image generated using the associated previous image which is displayed at a substantially same display time as a display time of the previous image.

9. The multiview video decoding apparatus according to claim 1, wherein said decoding unit is configured to decode the one of the coded videos which is a coded video for a left eye to generate the one of the decoded videos, and decode the other one of the coded videos which is a coded video for a right eye to generate the other one of the decoded videos, the one of the coded videos and the other one of the coded videos being two coded videos which are the coded videos generated by coding the videos from the viewpoints that are a left-eye viewpoint and a right-eye viewpoint, said error detecting unit is configured to detect the error image from among the decoded images included in either the one of the decoded videos and the other one of the decoded videos, and said decoded image replacing unit is configured to replace the error image with the first decoded image, and replace the associated error image with the second decoded image.

10. A multiview video decoding method for decoding a plurality of coded videos generated by coding videos from a plurality of viewpoints, said multiview video decoding method comprising:

decoding one of the coded videos without reference to a decoded image included in an other one of the coded videos to generate one of decoded videos which is composed of a plurality of decoded images, and decode the other one of the coded videos with reference to a decoded image included in the one of the decoded videos to generate an other one of the decoded videos;

detecting an error-source image which is a decoded image including an error, from among the decoded images included in either the one of the decoded videos or the other one of the decoded videos;

replacing the detected error-source image with a first decoded image which does not include an error, the detected error-source image being included in a first decoded video which is either the one of the decoded videos or the other one of the decoded videos; and replacing an associated error image with a second decoded image, the associated error image being (i) included in a second decoded video which is other than the first decoded video including the error-source image and (ii) displayed in association with the error-source image, wherein, in said replacing:

the error-source image is replaced with the first decoded image without using the second decoded video, the first decoded image being generated using a previous image which is a decoded image included in the first decoded video decoded before the decoding of the error-source image; and the associated error image is replaced with the second decoded image without using the first decoded video, the second decoded image being generated using an associated previous image which is a decoded image included in the second decoded video and displayed in association with the previous image included in the first decoded video.

11. A program which is recorded on a non-transitory computer-readable recording medium and is for decoding a plurality of coded videos generated by coding videos from a plurality of viewpoints, said program causing a computer to execute:

decoding one of the coded videos without reference to a decoded image included in an other one of the coded videos to generate one of decoded videos which is composed of a plurality of decoded images, and decode the other one of the coded videos with reference to a decoded image included in the one of the decoded videos to generate an other one of the decoded videos;

detecting an error-source image which is a decoded image including an error, from among the decoded images included in either the one of the decoded videos or the other one of the decoded videos;

replacing the detected error-source image with a first decoded image which does not include an error, the detected error-source image being included in a first decoded video which is either the one of the decoded videos or the other one of the decoded videos; and replacing an associated error image with a second decoded image, the associated error image being (i) included in a second decoded video which is other than the first decoded video including the error-source image and (ii) displayed in association with the error-source image, wherein, in the replacing:

the error-source image is replaced with the first decoded image without using the second decoded video, the first decoded image being generated using a previous image which is a decoded image included in the first decoded video decoded before the decoding of the error-source image; and the associated error image is replaced with the second decoded image without using the first decoded video, the second decoded image being generated using an associated previous image which is a decoded image included in the second decoded video and displayed in association with the previous image included in the first decoded video.

12. An integrated circuit which decodes a plurality of coded videos generated by coding videos from a plurality of viewpoints, said integrated circuit comprising:

a decoding unit configured to decode one of the coded videos without reference to a decoded image included in an other one of the coded videos to generate one of decoded videos which is composed of a plurality of decoded images, and decode the other one of the coded videos with reference to a decoded image included in the one of the decoded videos to generate an other one of the decoded videos;

an error detecting unit configured to detect an error-source image which is a decoded image including an error, from among the decoded images included in either the one of the decoded videos or the other one of the decoded videos; and a decoded image replacing unit configured to:

replace the detected error-source image with a first decoded image which does not include an error, the detected error-source image being included in a first decoded video which is either the one of the decoded videos or the other one of the decoded videos; and replace an associated error image with a second decoded image, the associated error image being (i) included in a second decoded video which is other than the first decoded video including the error-source image and (ii) displayed in association with the error-source image, wherein said decoded image replacing unit is configured to:

replace, without using the second decoded video, the error-source image with the first decoded image which is generated using a previous image which is a decoded image included in the first decoded video decoded before the decoding of the error-source image; and replace, without using the first decoded video, the associated error image with the second decoded image which is generated using an associated previous image which is a decoded image included in the second decoded video and displayed in association with the previous image included in the first decoded video.

* * * * *